(12) United States Patent
Nassim

(10) Patent No.: US 11,784,478 B1
(45) Date of Patent: Oct. 10, 2023

(54) DEVICES, METHODS, AND SYSTEMS FOR ADJUSTABLY MOUNTING DEVICES TO SURFACE STRUCTURES

(71) Applicant: Elias Nassim, Ft. Lauderdale, FL (US)

(72) Inventor: Elias Nassim, Ft. Lauderdale, FL (US)

( * ) Notice: Subject to any disclaimer, the term of this patent is extended or adjusted under 35 U.S.C. 154(b) by 0 days.

(21) Appl. No.: 18/075,960

(22) Filed: Dec. 6, 2022

(51) Int. Cl.
| | | |
|---|---|---|
| *H02G 3/12* | (2006.01) | |
| *H02G 3/14* | (2006.01) | |
| *H02G 1/00* | (2006.01) | |
| *H01R 13/74* | (2006.01) | |
| *H01R 25/00* | (2006.01) | |

(52) U.S. Cl.
CPC .......... *H02G 3/125* (2013.01); *H01R 13/748* (2013.01); *H02G 1/00* (2013.01); *H02G 3/14* (2013.01); *H01R 25/006* (2013.01)

(58) Field of Classification Search
CPC .......... H02G 3/08; H02G 3/081; H02G 3/121; H02G 3/126; H02G 3/125; H02G 3/10; H02G 3/12; H02G 3/14; H02G 3/266; H02G 1/00; H01H 23/04; H01H 9/02; H01H 9/0207; H01H 9/04; H01H 23/06; H01H 13/04; H01R 25/006; H01R 13/748; H01R 13/73
USPC .. 174/480, 481, 50, 53, 57, 58, 63, 61, 502, 174/491, 503; 220/3.2–3.9, 4.02; 248/906; 52/220.1, 220.8, 220.3
See application file for complete search history.

(56) References Cited

U.S. PATENT DOCUMENTS

| | | | | |
|---|---|---|---|---|
| 2,316,389 | A * | 4/1943 | Atkinson | H02G 3/126 248/906 |
| 7,312,396 | B1 * | 12/2007 | Gorman | H02G 3/125 174/480 |
| 7,816,604 | B1 * | 10/2010 | Gretz | H01R 25/006 174/58 |
| 7,956,285 | B2 * | 6/2011 | Tally | H02G 1/00 174/53 |
| 8,770,526 | B2 * | 7/2014 | Siddiqui | H02G 3/125 174/58 |
| 8,785,774 | B1 * | 7/2014 | Gretz | H02G 3/126 174/57 |
| 9,608,420 | B1 * | 3/2017 | Ferrara | H02G 3/14 |
| 9,705,297 | B1 * | 7/2017 | Nassim | H02G 1/00 |
| 9,825,446 | B2 * | 11/2017 | Korcz | H02G 3/125 |
| 11,473,721 | B2 * | 10/2022 | Oh | H02G 3/08 |

* cited by examiner

*Primary Examiner* — Angel R Estrada
(74) *Attorney, Agent, or Firm* — Derek Fahey, Esq.; The Plus IP Firm, PLLC

(57) ABSTRACT

A system for adjustably mounting a component of an electrical assembly to a wall structure; the wall structure including at least a wallboard. The system is configured so that an outward facing surface of the component may be adjustably positioned relative to the outward facing surface of the wallboard. The system comprises of a bracket disposed between adjacent studs of a wall structure, a base plate, a mounting plate, a cover plate, protective plate, an electrical component fastener, and an electrical component opening. A method for adjustably mounting a component of an electrical assembly to a wall structure comprising a mounting plate, a base plate, a bracket, a stud of the wall structure, a planar surface of the wall structure with adhesive, threaded fasteners, a component of an electrical assembly, a cover plate, and a protective plate.

20 Claims, 19 Drawing Sheets

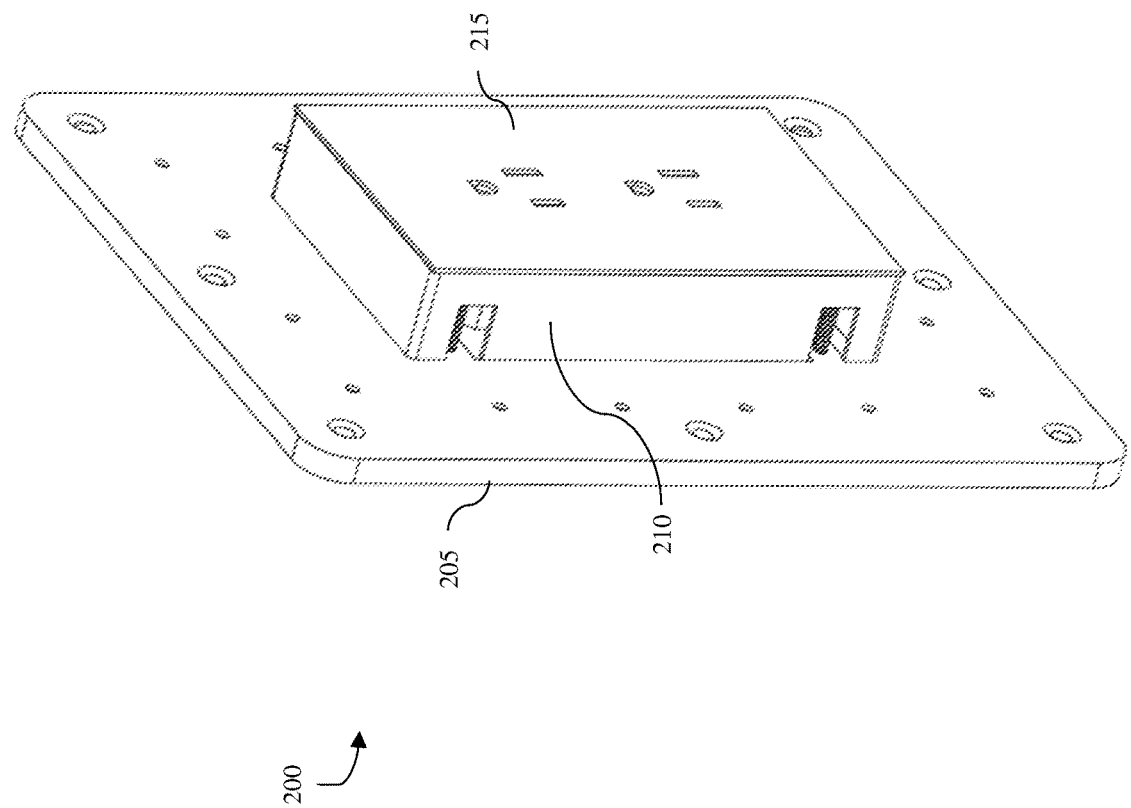

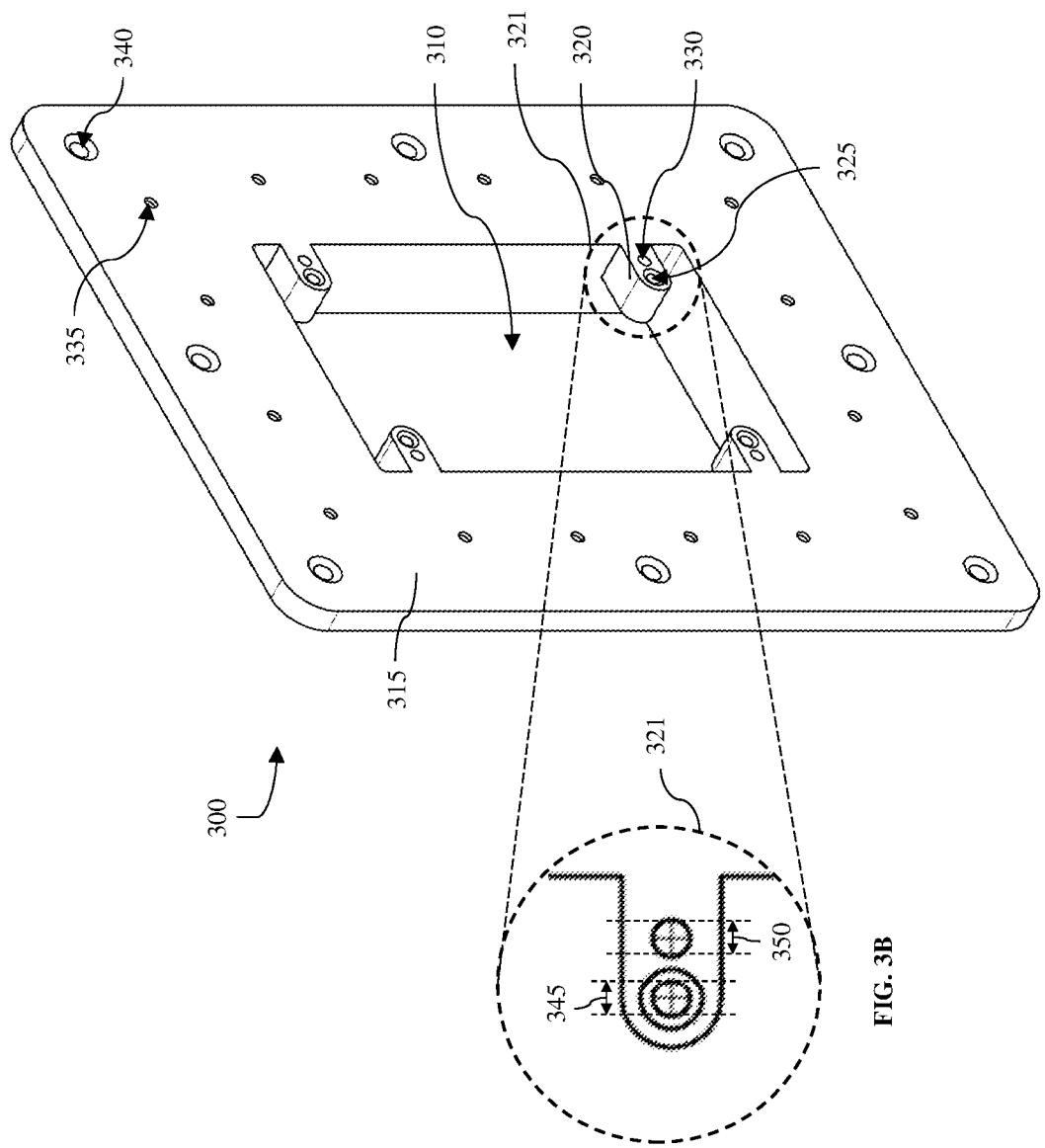

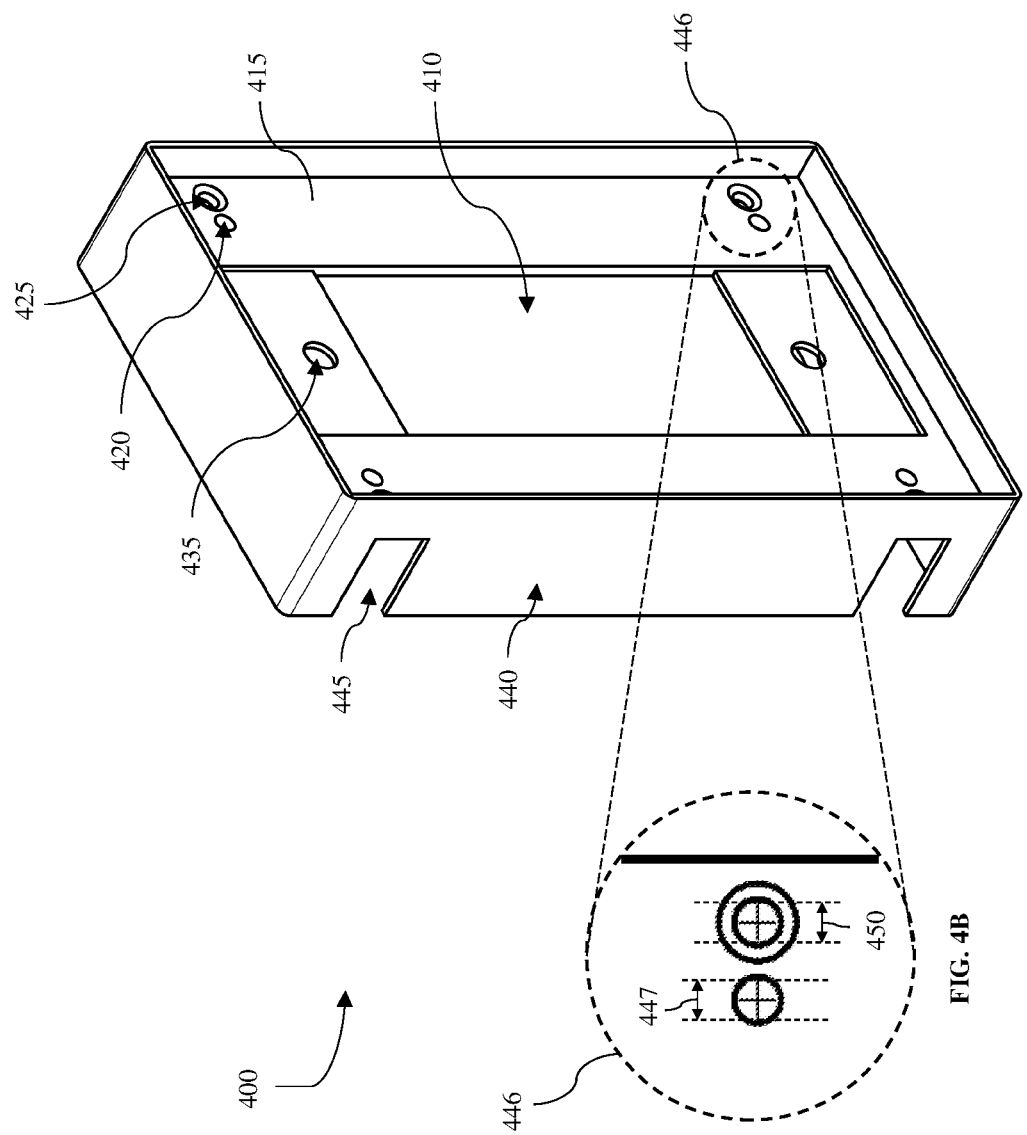

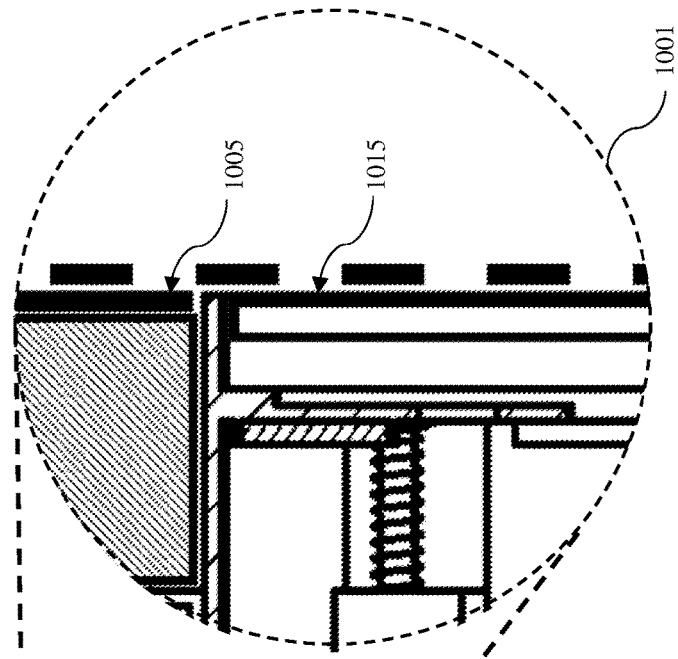
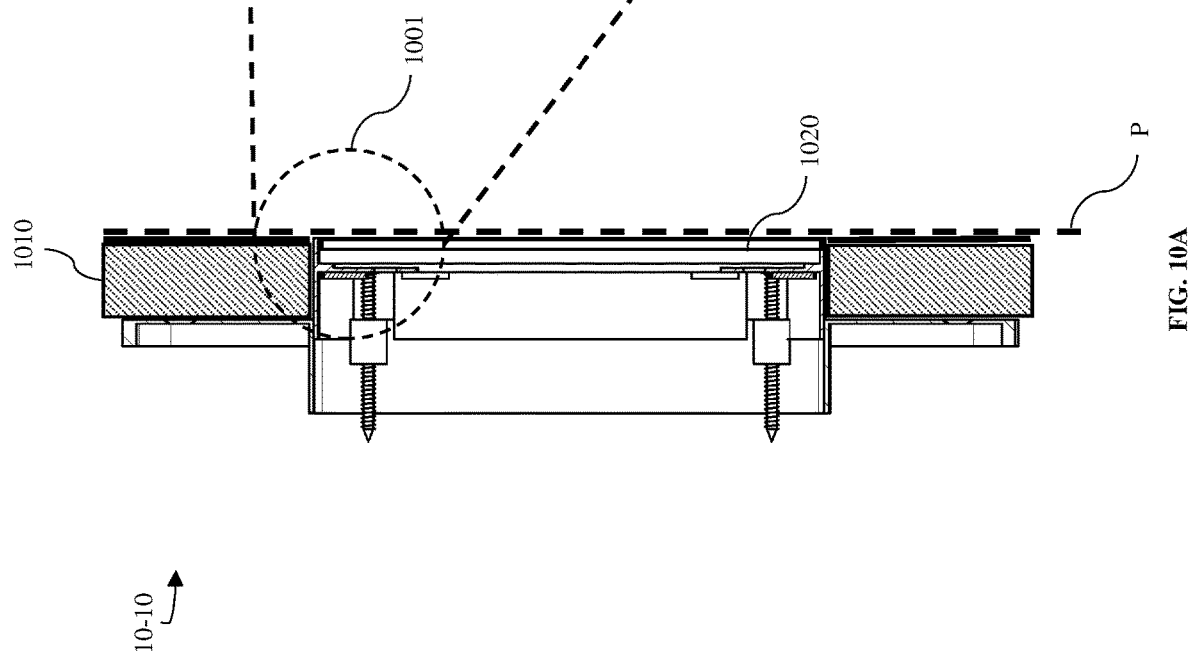
FIG. 10B
FIG. 10A

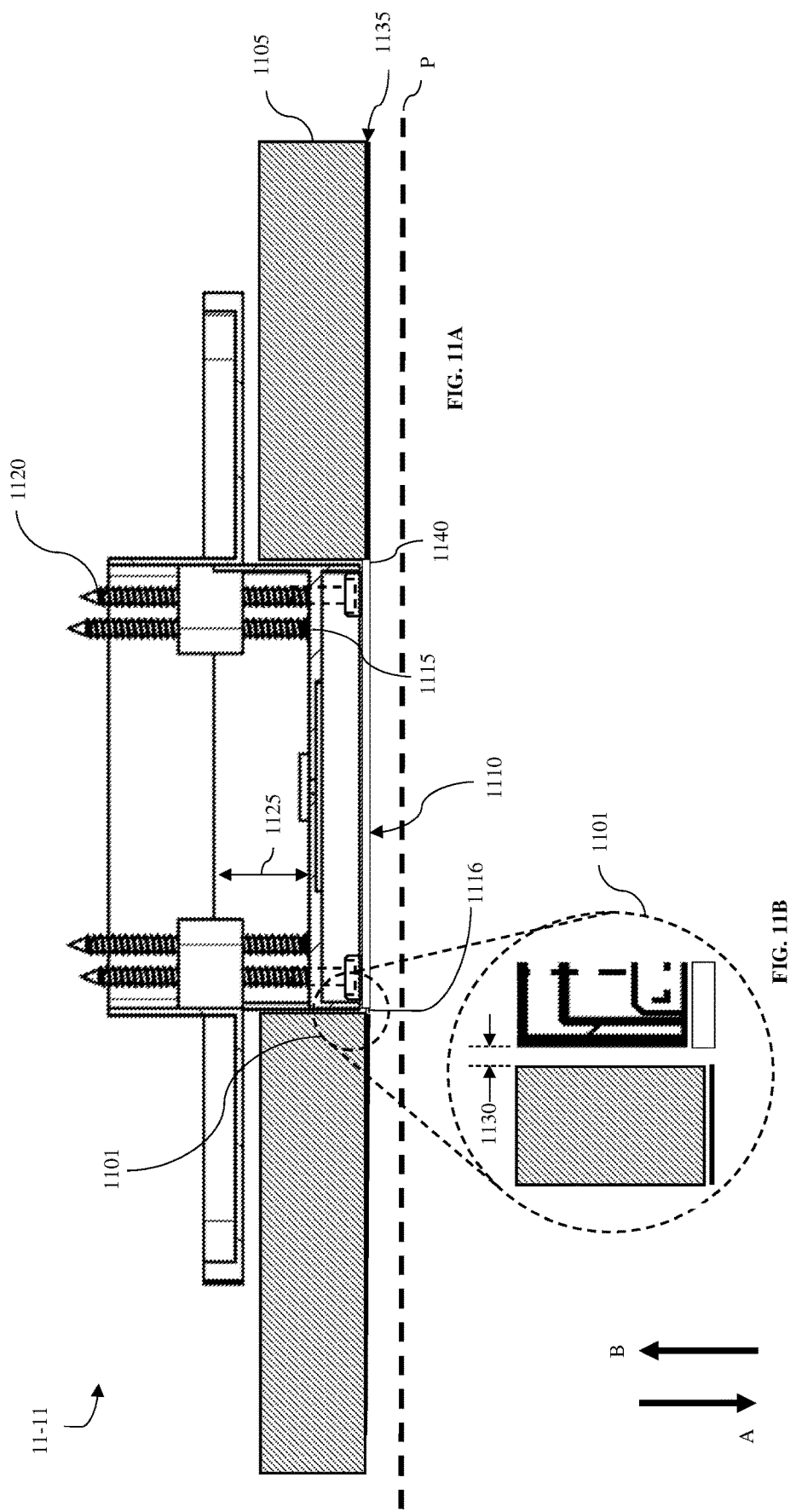

DEVICES, METHODS, AND SYSTEMS FOR ADJUSTABLY MOUNTING DEVICES TO SURFACE STRUCTURES

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present disclosure relates to the field of electrical installments, and more specifically mounting devices within a building structure.

BACKGROUND

Electrical assemblies, such as electrical outlets and light switch plates, can be displeasing in the eyes of a home or building owner. These electrical assemblies are necessary for the premises to function properly. For example, a light switch itself is an important mechanism needed to allow electrical current to flow to a load, similarly outlets are necessary to allow electrical devices to connect to an electrical grid. However, these components do not need to be displayed within wall plates if they are not desired to be. Wall plates are considered ornamental, as they are not required by any building regulations. Therefore, the aesthetic of these products is heavily marketed to reach all consumers.

In order to appeal to all consumers, producers must take into account many different interior designs as well as preferences of the consumer. The prior art presents a plurality of wall plates decorated by themes such as sports, paintable plates, wooden or metallic plates, even custom designed plates to make the consumer pleased with the appearance. These components typically protrude outward from the front surface of the wall, and further extend from use of wall plates. However, the challenge we face stems from the location of the components. These electrical assemblies can be located all around a home or building including walls, floors, countertops, etc. Furthermore, the type of surface these assemblies are configured on range from stone to wood, tile, drywall, concrete, brick, etc. Some of these surfaces are so uniquely aesthetic that the home or building owner desires there to be minimal disruptions in these surfaces. This desire presents a need for a device that can adjust electrical assembly components to allow an outermost outward facing surface of the component to be flush with a surface. What the prior art lacks is a design for consumers who wish not to see a discontinuity between the surface and the component. This desire is difficult to satisfy given the prior art.

As a result, there exists a need for improvements over the prior art and more particularly for a system or method for flush mounting these devices to surfaces. The current system for making a component of an electrical assembly flush with a surface is exacting, tedious, and inconvenient for the average home/building owner. When the outcome desired is to be perfect or seamless, there creates a need for a device that may be adjustable to reach perfection.

SUMMARY

Devices, methods, and systems for adjustably mounting devices to surface structures is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a device, method, and system for adjustably mounting devices to surface structures is disclosed. The system comprises a wall structure having a wallboard attached to studs and having an electrical component available to be attached as a part of the electrical device assembly. The system also comprises at least one bracket disposed between adjacent studs of the wall structure, a base plate having a mounting surface, at least one mounting feature, and at least two threaded fasteners. A mounting plate having a mounting surface, at least one mounting feature, at least two fasteners, and at least one mounting plate magnet. Furthermore, the system comprises a cover plate having at least one cover plate magnet coupling with the mounting plate magnet. In a fully assembled configuration, a second portion of the first threaded fastener engages an inward facing surface of the mounting plate ring shaped mounting surface and prevents the mounting plate from moving inward. Additionally, a second portion of the second threaded fastener engages an outward facing surface of the mounting plate ring shaped mounting surface and prevents the mounting plate from moving outward.

When assembled, the base plate may be attached to the bracket with adhesive. Once attached, the mounting plate may be secured to the base plate by use of threaded fasteners. Two threaded fasteners may be used on each mounting feature, one fastener will engage the inward facing surface preventing the mounting plate from moving inward and the other will engage the outer facing surface preventing the mounting plate from moving outward. The threaded fasteners allow the mounting plate to be adjusted to the desired distance. The cover plate, being magnetically secured to the mounting plate, will be flush with the outermost surface of the wallboard. The outermost surface of the cover plate acts as the outermost surface of the electrical component when in the fully assembled configuration.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein;

FIG. 2 is a front-left side perspective view of the system, according to an example embodiment FIG. 3A is a front perspective view of a base plate of the system, according to an example embodiment;

FIG. 3B is a detailed view of FIG. 3A, according to an example embodiment;

FIG. 4A is a front perspective view of a mounting plate of the system, according to an example embodiment;

FIG. 4B is a detailed view of FIG. 4A, according to an example embodiment;

FIG. 10A is a side cross-sectional view of FIG. 9 along cross-section 10-10, according to an example embodiment;

FIG. 10B is a detailed view of FIG. 10A, according to an example embodiment;

FIG. 11A is a bottom cross-sectional view of FIG. 9 along cross-section 11-11, according to an example embodiment;

FIG. 11B is a detailed view of FIG. 11A, according to an example embodiment;

Figure 1B:
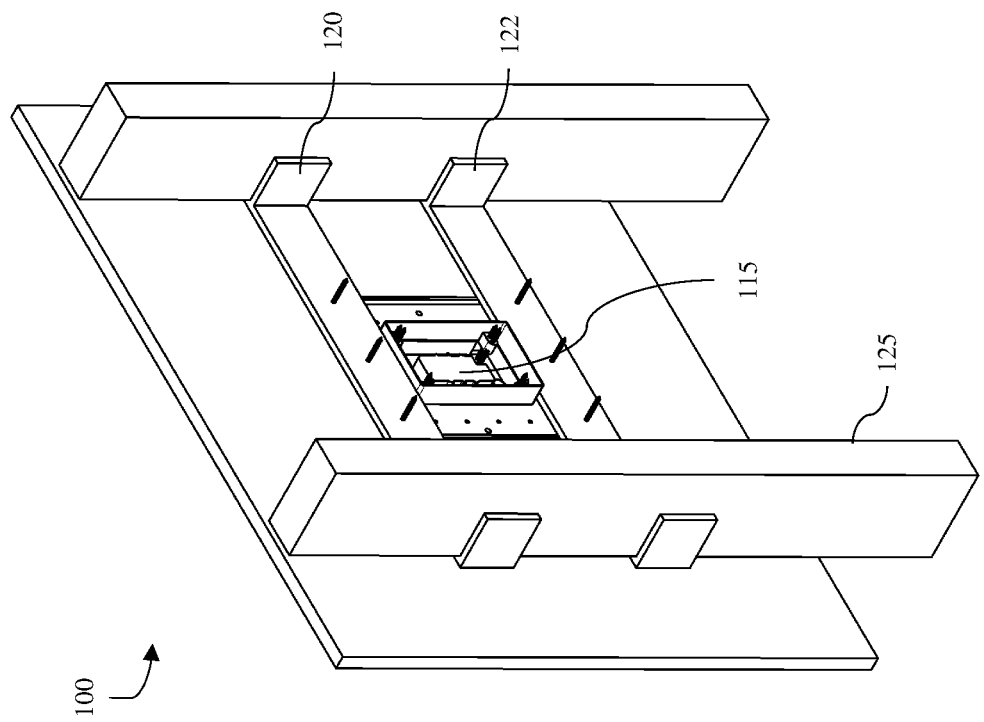
FIG. 1B is a rear perspective view thereof, according to an example embodiment.

The embodiments of FIGS. 1A through 13B are drawn to scale. It is understood that the example embodiments are proportioned to fit a two-socket electrical assembly; however, the system may be proportioned to fit other electrical assemblies within the spirit and scope of the present disclosure.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system for adjustably mounting a component of an electrical devices to surface structures. More specifically, the system provides a seamless transition between an electrical component on a surface of a building such that the outermost surface of the electrical component is flush with the surface. The smooth transition makes the electrical component look more appealing in the building as if the electrical component was merged with the wall or any other surface in a building. Additionally, the method to be described herein helps save time and money by providing the opportunity to combine the inspection and installation processes.

Figure 1A:
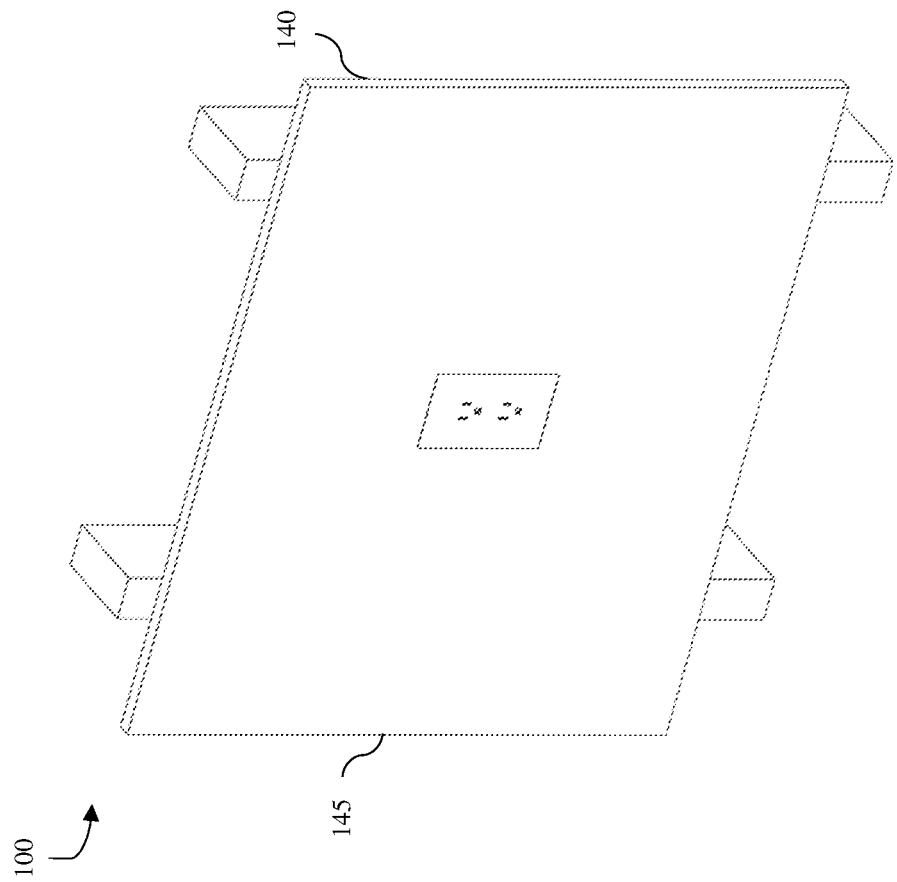
FIG. 1A is a front perspective view of a system including a wall and an electrical assembly, according to an embodiment of the present invention.

Referring now to the Figures, FIGS. 1A and 1B illustrate a system 100 designed for adjustably mounting a component of an electrical assembly 110 to a wall structure, according to an example embodiment. The wall structure includes a wallboard 140 with an outward facing surface of the wallboard 145 and adjacent studs 125 within the wall structure. The studs are necessary to allow for at least one bracket 120 to be attached to the wall structure. The at least one bracket is disposed between adjacent studs of the wall structure and provides a rigid mounting surface. The system is configured so that an outward facing surface of the component may be adjustably positioned relative to the outward facing surface of the wallboard. The outward facing surface of the component will be substantially flush with the outward facing surface of the wallboard, displaying a seamless finish. In some embodiments, the outward facing surface is the outermost outward facing surface (which a user may see). The seamless finish is defined by the seamless, or smooth, transition between the electrical assembly and the wall structure. Substantially flush is defined by two sides or surfaces that are on the same plane, as depicted in FIGS. 10A through 11A. The seamless finish makes the system most desirable to use when needing to mount electrical devices to a plurality of surfaces.

In an ideal embodiment, the wall structure will include two adjacent studs as well as at least two brackets to ensure security and longevity of the system. The at least two brackets that are slidably engaged such that the brackets are slidably mounted with respect to each other to extend between the adjacent studs. For example, while typical stud spacing in residential building construction is 16 inches on center, the studs can have various spacing and the sliding capability of the brackets permits the brackets to accommodate the various spacings, including also spacings that only approximate 16 inches on center but are irregular. The bracket may have a C-channel section that is sized and shaped to slidingly receive a smaller C-channel of bracket. As such, bracket 120 may slide with respect bracket 122 while also being retained in the vertical and horizontal directions. In addition, the C-channels themselves provide rigidity against bending in both the vertical and horizontal directions. Slidably engaged means that the brackets may extend or retract allowing the brackets to change lengths and fit between studs of various spacings. Slidably attached means that the brackets may slide vertically along the adjacent studs to change the distance between the brackets to accommodate different sizes of the component. However, in other embodiments, the number of studs and brackets being used may vary depending on the type of wall structure, the material properties of the wall structure, the shape, size, and orientation of the electrical component, the number of materials available to the user, or simply the preference of the user.

Figure 1D:
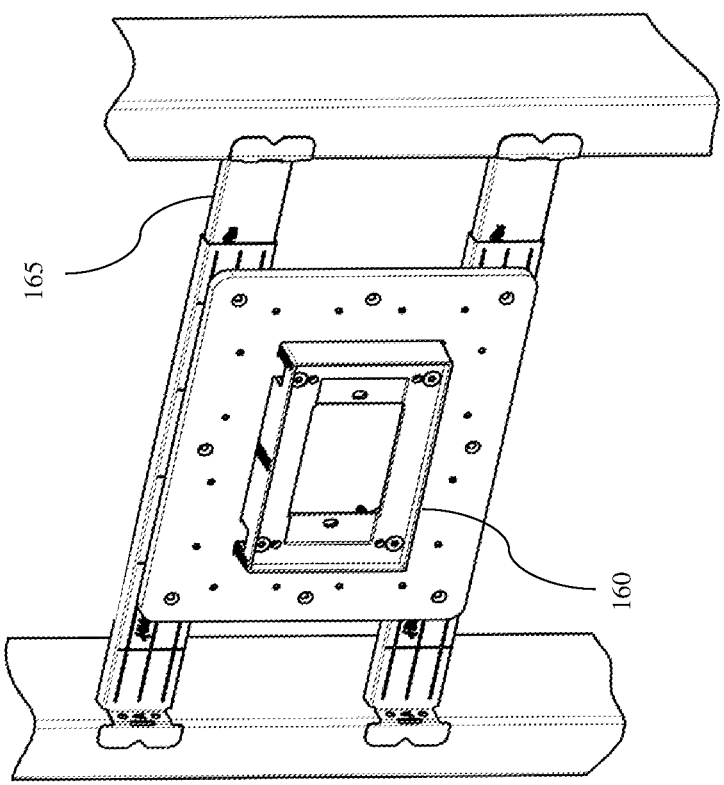
FIG. 1D is a third front perspective view of the system including a wall and an electrical assembly, according to a third example embodiment.

In the present embodiment, the component is in the form of a dual three prong electrical outlet, however in other embodiments the component may be in the form of an ethernet outlet, a USB outlet, a light switch, an HVAC controller, a smart outlet, etc. FIG. 1D illustrates another example embodiment of the system, having the electrical component oriented horizontally. This system is very flexible and may be used for a wide variety of electrical assembly components.

Figure 1C:
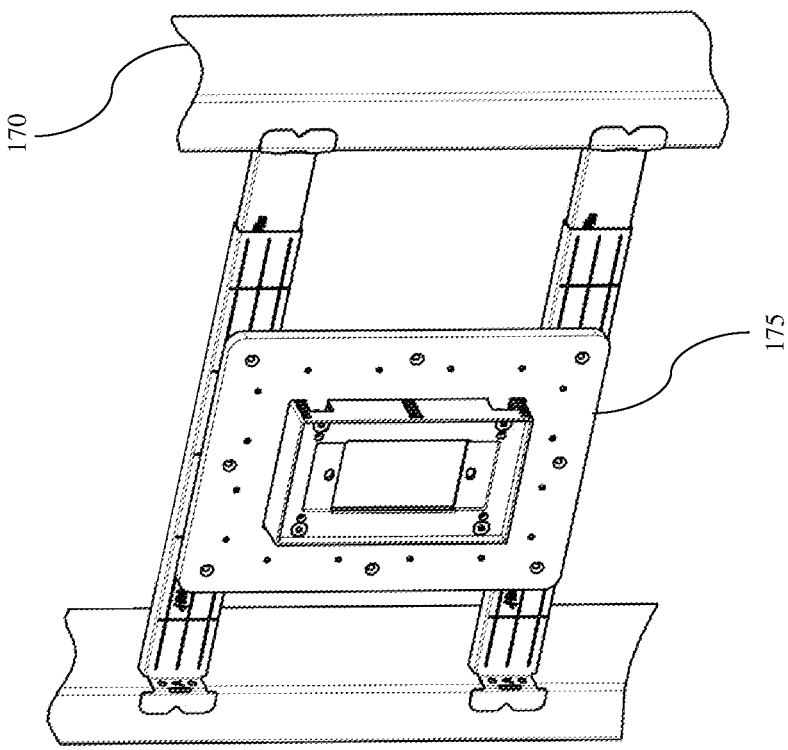
FIG. 1C is a second front perspective view of the system including a wall and an electrical assembly, according to a second example embodiment.
Figure 3C:
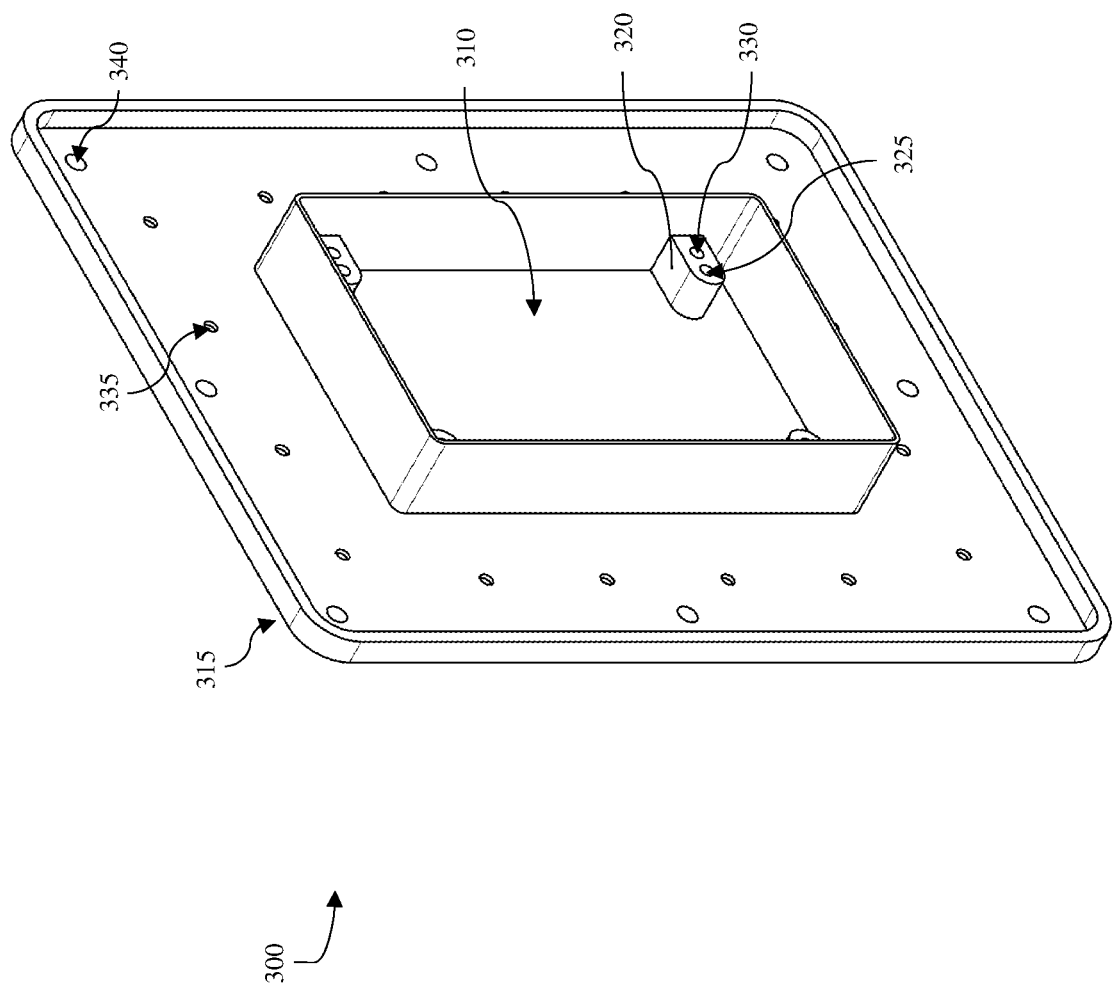
FIG. 3C is a rear perspective view of the base plate, according to an example embodiment.

FIGS. 1C and 1D are examples of type of embodiment of the system. These embodiments include a stud 170, a bracket 165, a mounting plate 160, and a base plate 175. The brackets shown include score lines to assist with accuracy, please refer to FIG. 1E. FIG. 1C arranges the base plate and mounting plate vertically, while FIG. 1D arranges the base plate and mounting plate horizontally. The versatility of this system and method allows for installers to make almost any electrical component substantially flush with the outermost outward facing surface of the wall, displaying a seamless finish. The seamless finish is defined by the seamless, or smooth, transition between the electrical assembly and the wall structure. Substantially flush is defined by two sides or surfaces where the outermost surface defines the same plane, as depicted in FIGS. 10A through 11B. The flush finish makes the system most desirable to use when needing to mount electrical devices to a plurality of surfaces and is more aesthetically pleasing. Refer to FIG. 3A through 3C regarding the base plate, and FIG. 4A through FIG. 4C regarding the mounting plate.

Figure 1E:
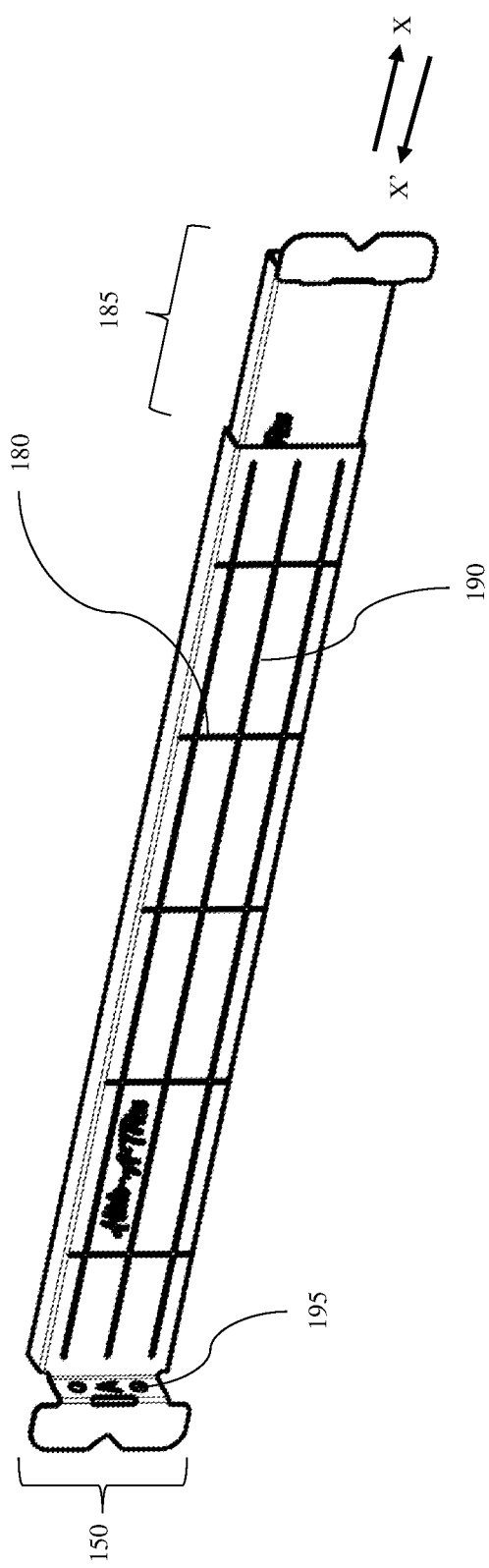
FIG. 1E is a front perspective view of a bracket of the system, according to an example embodiment.

FIG. 1E illustrates one embodiment of the brackets. In this example embodiment, the bracket includes horizontal score lines 190 as well as vertical score lines 180 to help with mounting the electrical device assemblies in vertical and horizontal alignment. The example embodiment also includes a sliding feature 185 allowing the bracket to change lengths and be adjusted as needed by applying a force translating in a direction X and/or X'. To extend the bracket the installer must pull on the sliding feature by use of tensile forces, and to retract the bracket the installer must push on the sliding feature by use of compressive forces. Therefore, the bracket becomes slidably engaged. Slidably engaged means that the brackets may extend or retract allowing the brackets to change lengths and fit between studs of various spacings. Also illustrated are fastener openings 195 allowing the bracket to be adhered to the studs. Fasteners that may be used include screws, such as machine screws, self-tapping screws, hex screws, etc. and may be made from metals, such as steel, iron, copper, aluminum, or thermoplastics, such as polypropylene, polyvinyl chloride (PVC), polyurethane, etc. The opening may also be in the form of an adhesive. The adhesive may be a pressure sensitive adhesive including materials such as comprise lanolin, mineral oil, petrolatum, rosin, silicone, and zinc oxide. Other adhesive and fasteners may be used and are within the spirit and scope of the present disclosure. The example embodiment of a bracket also includes a flanged portion 150 to attach the bracket to the stud itself. This flanged portion may be made from materials with high elasticity allowing them to form to the studs more easily. In other embodiments the flanged portion may appear to be shaped or sized differently. The brackets may be formed from a single piece or from several individual pieces joined or coupled together. The brackets may also be manufactured from a variety of processes including extrusion, molding, casting, folding, etc. The brackets may be comprised of metallic materials such as carbon steel, stainless steel, aluminum, titanium, other alloys, etc., or polymeric materials such as polycarbonates, such as Acrylonitrile butadiene styrene (ABS plastic), Lexan™, and Makrolon™ polypropylene, polyvinyl chloride (PVC), polyurethane, etc. However, other materials and manufacturing processes may also be used and are within the spirit and scope of the present invention.

The wallboard may also vary in other embodiments. For example, the location may influence the type of material the wallboard is made out of. Locations may range from bedrooms, to bathrooms, to showers, to mantles, to patios, etc. The wallboard material may vary in these different locations due to aesthetics, natural elements, or structural needs of a home or building. Materials of the wallboard may include drywall, stone, tile, glass, wood, cement, metal, etc. Furthermore, the textures may vary from smooth to rough, wavy to flat, etc. However, other types of wallboards may also be used and are within the spirit and scope of the present invention. By using the present invention, the outward facing surface of the component has the ability to be substantially flush with the outermost outward facing surface of the wallboard, displaying a seamless finish. If the material of the wallboard is textured, an installer may use this device to line up the texture pattern of the cover plate with the texture pattern of the outermost outward facing surface of the wallboard. The seamless finish is defined by the seamless, or smooth, transition between the electrical assembly and the wall structure. Substantially flush is defined by two sides or surfaces that are on the same plane, as depicted in FIGS. 10A through 11B. The seamless finish makes the system most desirable to use when needing to mount electrical devices to a plurality of surfaces.

FIG. 2 illustrates the system 200, according to an example embodiment. The electrical assembly includes a base plate 205, a mounting plate 210, and a cover plate 215. The base plate and mounting plate are in attachment by threaded fasteners. Each of the threaded fasteners may include screws, such as machine screws, self-tapping screws, hex screws, etc. and may be made from metals, such as steel, iron, copper, aluminum, or thermoplastics, such as polypropylene, polyvinyl chloride (PVC), polyurethane, etc. However, other types of threaded fasteners may also be used and are within the spirit and scope of the present invention. The mounting plate and cover plate are in attachment by magnetic force from at least one magnet. The magnets used in the cover plate and mounting plate may be permanent magnets such as neodymium iron boron (NdFeB), samarium cobalt (SmCo), alnico, ceramic, ferrite, etc. However, other types of magnets may also be used and are within the spirit and scope of the present invention. In other embodiments the shape of the base plate, mounting plate, and cover plate may vary in shape, size, and orientation. The magnets are configured to help the mounting plate to maintain attachment with the cover plate.

FIG. 3A through FIG. 3C illustrate a front and rear isometric view, respectively, of the base plate 300, according to an example embodiment. The base plate includes a base plate main opening 310, a base plate ring shaped mounting surface 315, at least one mounting feature 320, a base plate first fastener opening 325, a base plate second fastener opening 330. The base plate main opening is configured for receiving the component of the electrical assembly so that the component can be attached to the base plate and at least partially extend into the electrical assembly so that electrical service wires can be attached to the component and wired to connect into the buildings wiring system. The base plate ring shaped mounting surface encloses the base plate main opening and attaches to at least one of the at least of one bracket and a planar surface wall structure with an adhesive. The base plate ring shaped mounting surface includes at least a base plate fastener opening 340 for receiving a mounting fastener to attach the base plate to the at least one bracket. The at least one mounting feature protrudes into base plate main opening. The base plate may include at least one hole 335 that may be used to secure the base plate to an inner surface of the wallboard, such as a stud or brackets extending between adjacent studs, through use of the adhesive. The adhesive may be a pressure sensitive adhesive including materials such as comprise lanolin, mineral oil, petrolatum, rosin, silicone, and zinc oxide. Other adhesive may be used and are within the spirit and scope of the present disclosure.

Referring now to detailed view 321 shown in FIG. 3B, the diameter 345 of the base plate first fastener opening is configured to receive the first portion of the first fastener, and the diameter 350 of the base plate second fastener opening is configured to receive the first portion of the second fastener. The base plate may be formed from a single piece or from several individual pieces joined or coupled together. The base plate may also be manufactured from a variety of processes including extrusion, molding, casting, folding, etc. The base plate includes polymeric materials such as polycarbonates including Acrylonitrile butadiene styrene (ABS plastic), Lexan™, Makrolon™, polypropylene, polyvinyl chloride (PVC), polyurethane, etc. However, other materials and manufacturing processes may also be used and are within the spirit and scope of the present invention. The embodiment shown in FIG. 2 illustrates a rectangular shaped plate; however, in other embodiments, the size and shape of the base plate may vary by material or preference and are within the spirit and scope of the present invention.

Figure 4C:
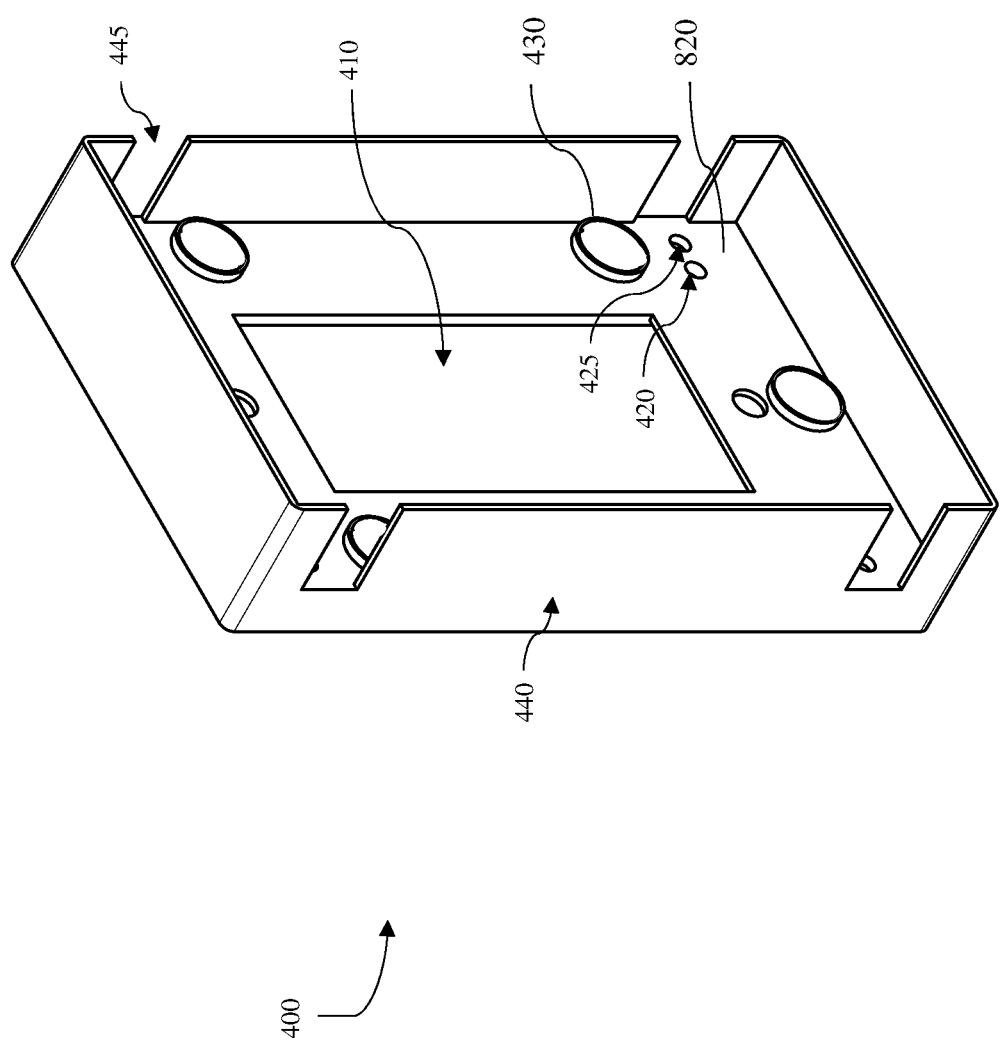
FIG. 4C is a rear perspective view of the mounting plate, according to an example embodiment.

FIG. 4A through FIG. 4C illustrates a front and rear isometric view, respectively, of a mounting plate 400 including a mounting plate main opening 410, a mounting plate ring shaped mounting surface 415, a mounting plate first fastener opening 420, a mounting plate second fastener opening 425, at least one electrical component opening 435, and at least one mounting plate magnet 430. The mounting plate ring shaped mounting surface encloses the mounting plate main opening. The mounting plate first fastener opening, and the mounting plate second fastener opening are disposed on the mounting plate ring shaped mounting surface. The mounting plate may include a plurality of mounting plate first fastener openings and a plurality of mount plate second fastener openings. The mounting plate magnet is supported by the mounting plate. The mounting plate includes a flanged portion 440 having a slot 445 configured for receiving the least one mounting feature. The flanged portion includes a rim around the mounting plate. Referring now to detailed view 446 shown in FIG. 4B, the diameter 447 of the mounting plate first fastener opening is smaller than the diameter of the second portion of the first fastener. The diameter 450 of the mounting plate second fastener opening is configured to receive the first portion of the second fastener.

Like the base plate, the mounting plate may be formed from a single piece or from several individual pieces joined or coupled together. The mounting plate may also be manufactured from a variety of processes including extrusion, molding, casting, folding, etc. The mounting plate may include polymeric materials such as polycarbonates including Acrylonitrile butadiene styrene (ABS plastic), Lexan™, Makrolon™, polypropylene, polyvinyl chloride (PVC), polyurethane, etc. However, other materials and manufacturing processes may also be used and are within the spirit and scope of the invention.

Each magnet may be a permanent magnet such as neodymium iron boron (NdFeB), samarium cobalt (SmCo), alnico, ceramic, ferrite magnets, etc. However, other types of magnets may also be used and are within the spirit and scope of the present invention. The embodiment illustrated in FIG. 4C shows four small, thin, and circular magnets. In other embodiments the number of magnets used may vary as well as the shape and size of each magnet. The variation may depend on the user's preference, the strength of the magnet, the resources available, etc.

Figure 5A:
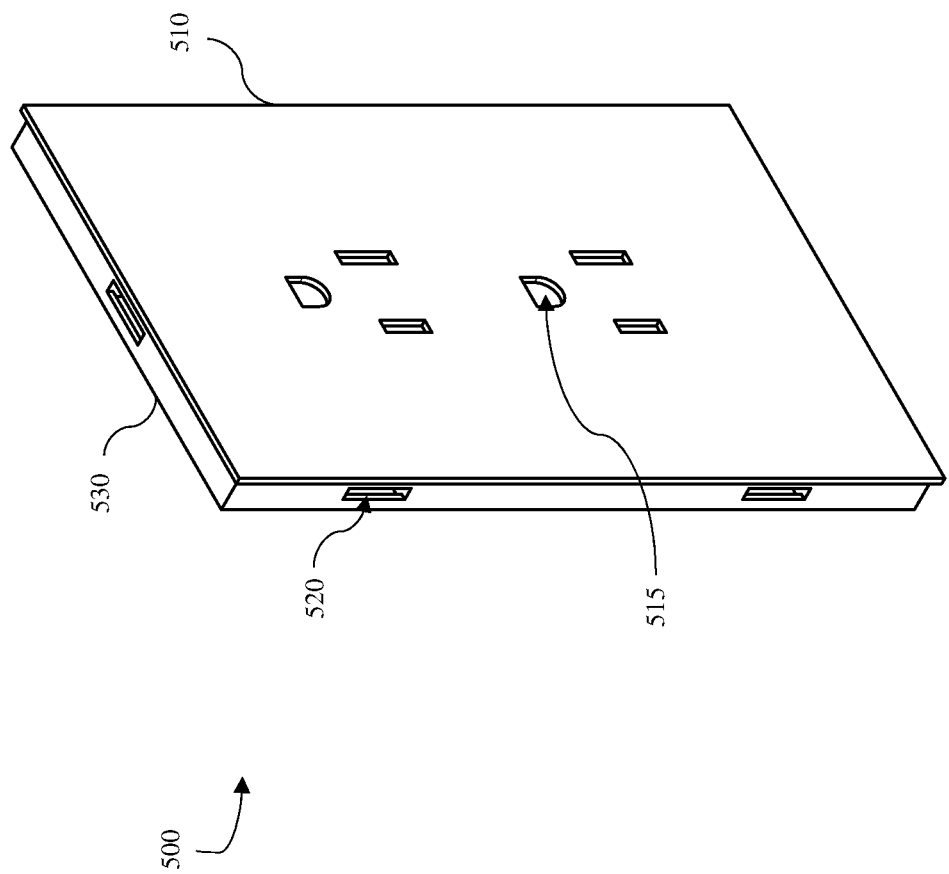
FIG. 5A is a front perspective view of a cover plate of the system, according to an example embodiment.
Figure 5B:
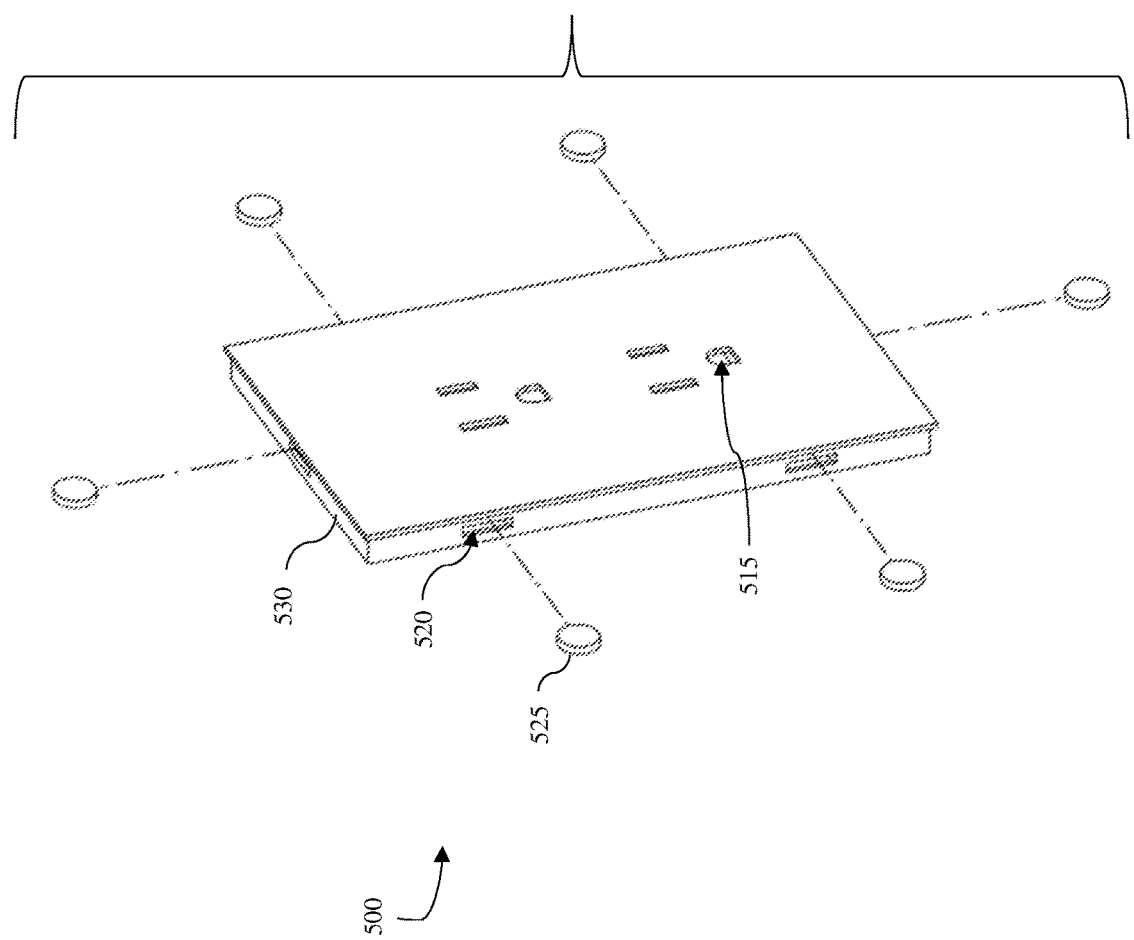
FIG. 5B is an exploded perspective view of the cover plate, according to an example embodiment.

FIGS. 5A and 5B illustrate a front and rear view of a cover plate 500 including a cover plate ring portion 530, a cover plate outward facing surface 510, at least one cover plate opening 515, at least one slot 520, and at least one cover plate magnet 525 supported by the cover plate ring portion. The cover plate defines at least one cover plate opening that provides functional access to the component of the electrical assembly. The at least one slot is disposed on the cover plate ring portion configured for receiving the least one cover plate magnet. The at least one mounting plate magnet magnetically couples with the at least one cover plate magnet such that the cover plate outward facing surface is the outermost component of the system when in the fully assembled configuration.

The cover plate openings may appear different in other embodiments. Depending on what the electrical assembly component is, the cover plate opening will align with what is needed. For example, a standard three prong receptacle will need three cover plate openings to fit the prongs of the plug. In a different embodiment, the component of the electrical assembly may be a light switch, where the cover plate may need one hole large enough to fit a rocker switch or small enough to for a toggle switch. In an ideal embodiment, the material of the cover plate is the same as the material of the outermost surface of the wall structure. This will create an accessible component almost invisible to the eye. However, any material may be used and are within the spirit and scope of the present invention. The embodiment illustrated in FIG. 5A shows three slots for magnets and FIG. 5B shows six small circular magnets, however in other embodiments the number of magnets used may vary as well as the number of slots. The variation may depend on the user's preference, the strength of the magnet, the resources available, etc. Like the base plate and mounting plate, the cover plate may be formed from a single piece or from several individual pieces joined or coupled together. The cover plate may also be manufactured from a variety of processes including extrusion, molding, casting, folding, etc. The cover plate may include polymeric materials such as polycarbonates including Acrylonitrile butadiene styrene (ABS plastic), Lexan™, Makrolon™, polypropylene, polyvinyl chloride (PVC), polyurethane, etc. However, other materials and manufacturing processes may also be used and are within the spirit and scope of the invention.

Figure 6:
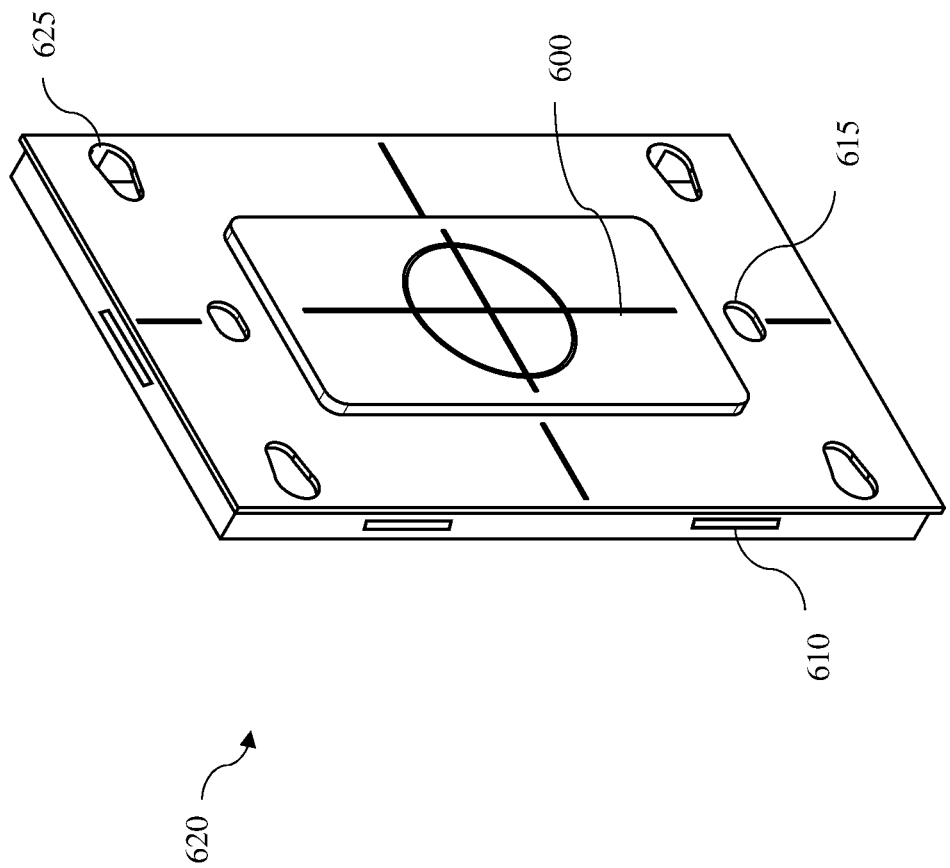
FIG. 6 is a front perspective view of an alignment plate of the system, according to an example embodiment.

FIG. 6 illustrates a front view of the protective plate 620 including score lines 600, electrical component openings 615, at least one hole 625, and a magnet slot 610. The dimensions of the protective plate are the same as the dimensions of the cover plate allowing it to act as the cover plate while adjusting the threaded fasteners to align the mounting plate. Because the protective plate acts as the cover plate and includes at least one hole for access to the threaded fasteners, the distance between the mounting plate and the base plate may be adjusted to align the outermost surface of the protective plate to be flush with the outermost surface of the wallboard.

Score lines help installers align objects vertically or horizontally. The protective plate includes score lines to help ensure that the position of over plate (when installed) will be centered. In other embodiments, score lines may appear differently. For example, the lines may vary in length or depth, or may only display cross hairs identifying the center of the plate. However other types of score lines may be used and are within the spirit and scope of the present invention.

The holes in the protective plate are an important feature that allow the user to adjust the mounting plate while observing the distance between the outermost surface of the wall to the outer most surface of the protective plate. The protective plate may be manufactured from a variety of processes including extrusion, molding, casting, folding, etc. The protective plate may include polymeric materials such as polycarbonates including Acrylonitrile butadiene styrene (ABS plastic), Lexan™, Makrolon™, polypropylene, polyvinyl chloride (PVC), polyurethane, etc. However, other materials and manufacturing processes may also be used and are within the spirit and scope of the invention. The embodiment illustrated in FIG. 6 shows three slots for magnets however in other embodiments the number of magnets used may vary as well as the number of slots. The variation may depend on the user's preference, the strength of the magnet, the resources available, etc.

Figure 7:
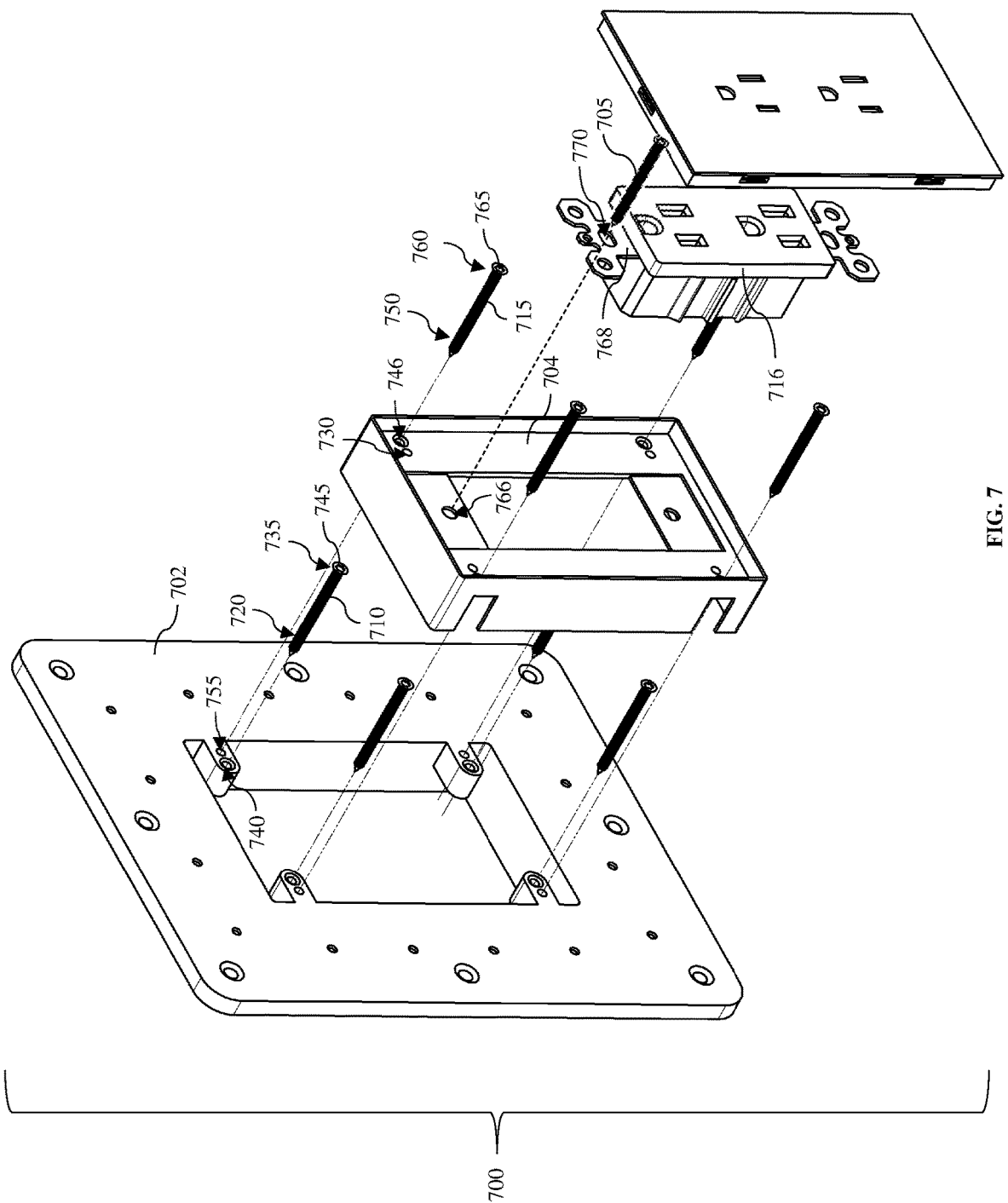
FIG. 7 is an exploded perspective view of the system including an electrical assembly, according to an example embodiment.

FIG. 7 illustrates an exploded view of an example embodiment of the system including the base plate 702, the mounting plate 704, the cover plate, a first threaded fastener 710, a second threaded fastener 715, an electrical component 716, and an electrical component fastener 705. Before the mounting plate is attached to the base plate, the first portion 720 of the first threaded fastener is attached to the base plate first fastener opening 740. The diameter of the mounting plate first fastener opening 730 is smaller than the diameter of the second portion 735 of the first fastener, i.e. the head of the screw, such that the diameter of the mounting plate first fastener opening is smaller than the diameter of the base plate first fastener opening 740. The diameter of the mounting plate first fastener opening is configured to prevent the second portion of the first threaded fastener from entering the mounting plate first fastener opening. The second portion of the first threaded fastener includes the terminating end 745. While the first threaded fastener is attached to the base plate first fastener opening, the mounting plate 704 is positioned on the base plate 702, and the first portion of the second threaded fastener is received by the mounting plate second fastener opening 746. The first portion 750 of the second threaded fastener is then attached to the base plate via the base plate second fastener opening 755. The second fastener allows the base plate to be in attachment to the mounting plate because the second portion 760 of the second threaded fastener, including the terminating end 765, engages the outward facing surface of the mounting plate ring shaped mounting surface to keep the mounting plate from moving outwards from the base plate. Because the diameter of the mounting plate first fastener opening is smaller than the diameter of the second portion of the first fastener, the terminating end of the first threaded fastener cannot pass through the mounting plate first fastener opening such that the mounting plate cannot be fastened toward the base plate past the terminating end of the first fastener.

The system further includes the electrical component that is attached to the mounting plate via an electrical component fastener. The electrical component fastener may be bolts, screws, nails, etc. However, other fasteners may be used and are within the spirit and scope of the present disclosure. At least one electrical component opening 766 is disposed inward from the mounting plate first fastener opening and second fastener. The electrical component fastener extends through the at least one electrical component opening attaching the mounting plate to the electrical component. The electrical component may include a connector tab 768 with a hole 770 configured to receive the electrical component faster. In the present embodiment, the electrical component is an electrical outlet. In other embodiments, the electrical component may be AC thermostats, dimming switches, light switchers, etc. Other electrical components may be used and are withing the spirit and scope of the disclosure.

Each of the fasteners may include bolts, screws, nails, etc. and may be made from metals such as steel, iron, copper, aluminum, or thermoplastics such as polypropylene, polyvinyl chloride (PVC), polyurethane, etc. However, other types of fasteners may also be used and are within the spirit and scope of the present invention.

The present embodiment shows a dual three prong outlet as the electrical assembly component, however other types of electrical assembly components may be used as well. The shapes of the cover, mounting, and base plates may also vary in other embodiments and are within the scope and spirit of the present invention.

Figure 8:
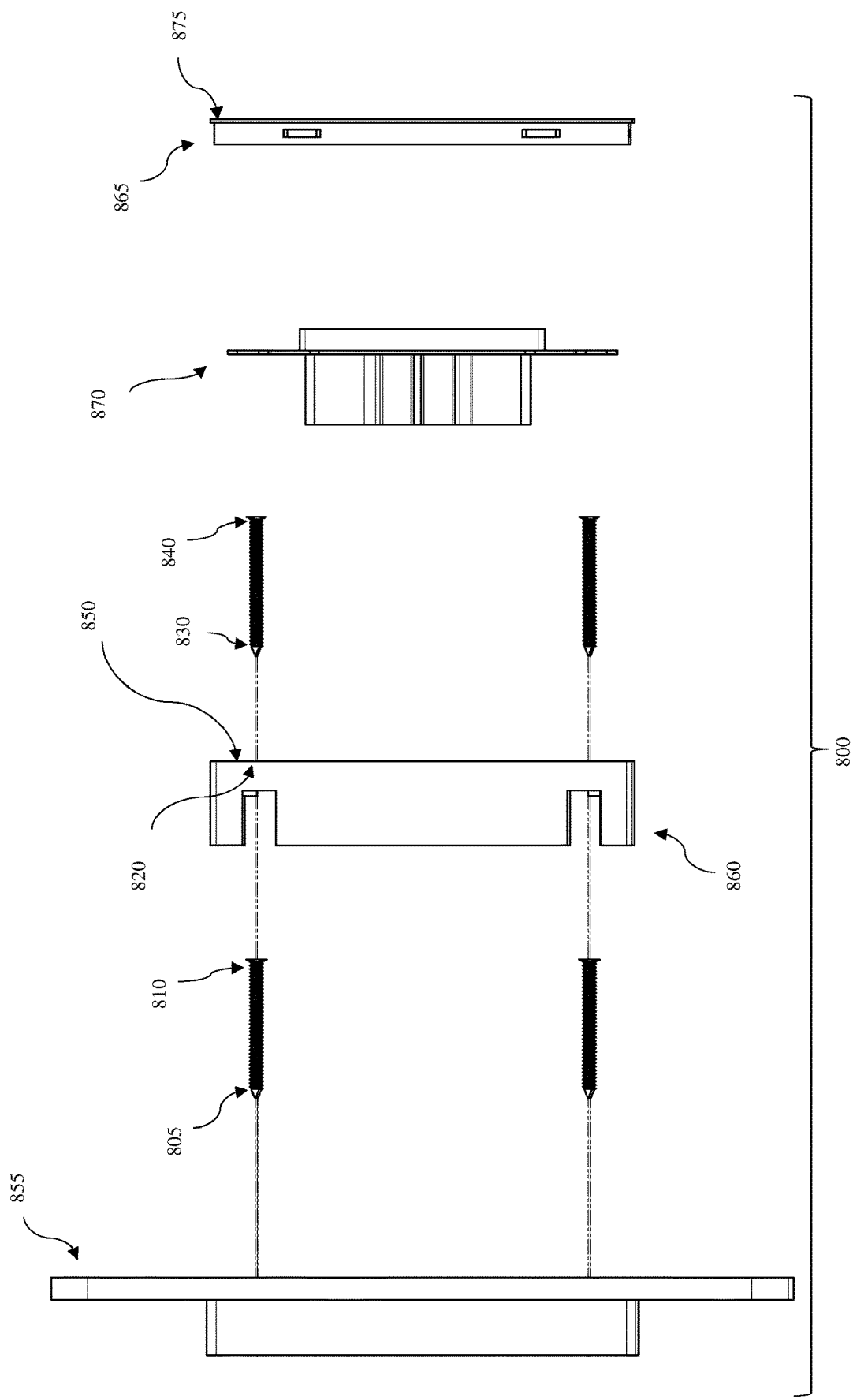
FIG. 8 is an exploded side view of the system, according to an example embodiment.

FIG. 8 illustrates a side exploded view of the system 800 including a base plate 855, mounting plate 860, electrical component 870, cover plate 865, outermost surface of the cover plate 875, and threaded fasteners. A first portion of a first threaded fastener 805 movably attaches to the base plate through the base plate first fastener opening on the at least one mounting feature, shown in FIG. 3A. This portion may be adjusted throughout the process. A second portion of the first threaded fastener 810 will butt against an inward facing surface 820, also shown more clearly in FIG. 4C, acting as a stopper, and preventing the mounting plate from moving inward. A first portion of a second threaded fastener 830 enters the mounting plate and movable attaches to the base plate through the first threaded fastener openings on the respective plates. This portion may be adjusted throughout the process. A second portion of the second threaded fastener 840 will engage an outward facing surface 850, also shown more clearly in FIG. 7, preventing the mounting plate from moving outward. The first and second threaded fasteners act as adjustable stopping elements to ensure that the outward facing surface of the mounting plate will be substantially flush with the outermost surface of the wall.

Figure 9:
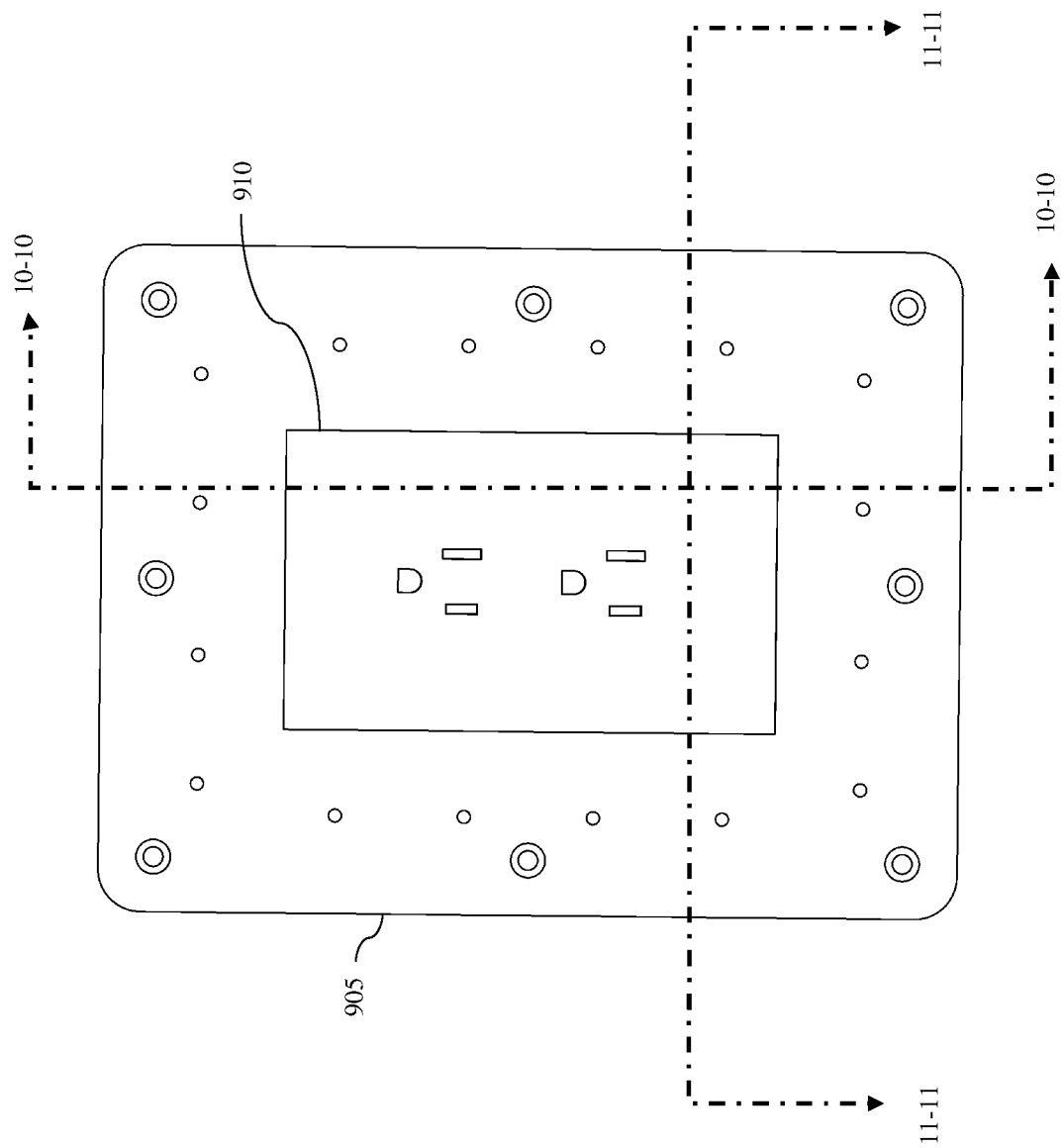
FIG. 9 is a front view of the system, according to an example embodiment.

FIG. 9 through FIG. 11B illustrates a front view, a side cross-sectional view, and a bottom cross-sectional view, respectively, of an example embodiment of the system 900 including a fully assembled configuration. FIG. 9 illustrates a front view of the system including a base plate 905, and a cover plate 910.

FIG. 10A through FIG. 10B shows a side view of the cross-section 10-10 of the system relative to the outermost outward facing surface of the wallboard. FIG. 10B is a detailed view 1001 of FIG. 10A. This embodiment includes a wall structure 1010, an outward facing surface of the wallboard 1005, a cover plate 1020, a cover plate outward facing surface 1015, and line P representing a plane parallel and adjacent to the plane that both the outermost surface of the cover plate and the outward facing surface of the wallboard exist on. The present embodiment illustrates the seamless appearance of the component within the wallboard because the cover plate outward facing surface sits flush with the outward facing surface of the wallboard. In order for two objects to be flush they must reside on the same plane. In this embodiment the outermost surface of the cover plate resides on the same plane as the outward facing surface of the wallboard, illustrated by a parallel and adjacent plane line P.

FIG. 11A through FIG. 11B shows a top view of a second cross-section 11-11 of the system relative to the outward facing surface of the wallboard. This embodiment includes a wall structure 1105, an outward facing surface of the wallboard 1135, a cover plate 1140, a cover plate outermost outward facing surface 1110, a terminating end of a first threaded fastener 1115, a second threaded fastener 1120, and a line P representing a parallel and adjacent plane of the plane the cover plate outward facing surface and the outward facing surface of the wallboard exist on.

The terminating end of the first threaded fastener acts a stopper against the inward facing surface of the mounting plate ring shaped mounting surface by creating a force in direction A to hinder the mounting plate from moving towards the base plate. The second threaded fastener creates a second force in direction B to hinder the mounting plate from moving away from the base plate. The forces against the mounting plate created by the first threaded fastener and the second threaded fastener cancel each other such that the mounting plate is secured into a position that creates the distance 1125 of the space in between the base plate and the mounting plate. This adjustable distance is important to ensure the cover plate outward facing surface sits flush with the outward facing surface of the wallboard. Flush being defined as two sides or surfaces where the outermost surface defines substantially the same plane.

As depicted in FIGS. 10A and 11A, both the cover plate outward facing surface and the outermost surface of the wallboard exist on the same plane, represented by a parallel and adjacent line P. In a fully assembled configuration, the second portion of the first threaded fastener engages an inward facing surface of the mounting plate ring shaped mounting surface and prevents the mounting plate from moving inward, and the second portion of the second threaded fastener engages the outward facing surface of the mounting plate ring shaped mounting surface and prevents the mounting plate from moving outward. It is understood that these figures are drawn to scale. While the outermost outward facing surface of the cover plate and the wallboard may not be exactly flush it is extremely close. Additionally, any gap between the wall board and the cover plate may include filler (represented in compound line 1116) so that no seem is present.

As shown in FIG. 11A, a hole is provided in the wallboard that is sized and shaped to receive the flanged portion of the mounting plate with a gap 1130 between the edge of the opening in the wall board and the flanged portion of the mounting plate. A more detailed view 1101 is shown in FIG. 11B. Adhesive is applied to the flanged portion of the mounting plate. The wallboard is then attached to the studs with the base plate ring shaped mounting surface extending into the hole in the wall board. Adhesive is applied to the base plate ring shaped mounting surface. The brackets are attached to the studs at a depth such that when the wallboard is attached to the studs, the base plate ring shaped mounting surface is urged against the back surface of the wall board. Accordingly, the base plate ring shaped mounting surface is forced against the wall board which causes the adhesive to spread along the base plate ring shaped mounting surface and adhere to the wallboard. Once the adhesive has dried, the adhesive provides a strong mechanical bond between the base plate and the wallboard. Since the base plate ring shaped mounting surface provides a large surface area for receiving adhesive, the bond strength is increased. The urging force between the base plate ring shaped mounting surface and the wallboard combined with the adhesive results in a strong bond between the base plate and the wallboard. Since there is a reduced chance of movement between the electrical assembly and the wallboard, there is a reduced chance of separation and/or cracks developing in the finished wall. Moreover, the present system provides advantages over other possible systems in that the hole provided in the wallboard can relatively approximate the size of a typical hole cut in wall board to accommodate a typical electrical box. This can reduce the amount of labor and skill to finish the wall board with compound as compared to other systems in which a separate wall board filler piece must be created and then the filler piece must be incorporated into the wall board.

Figure 12:
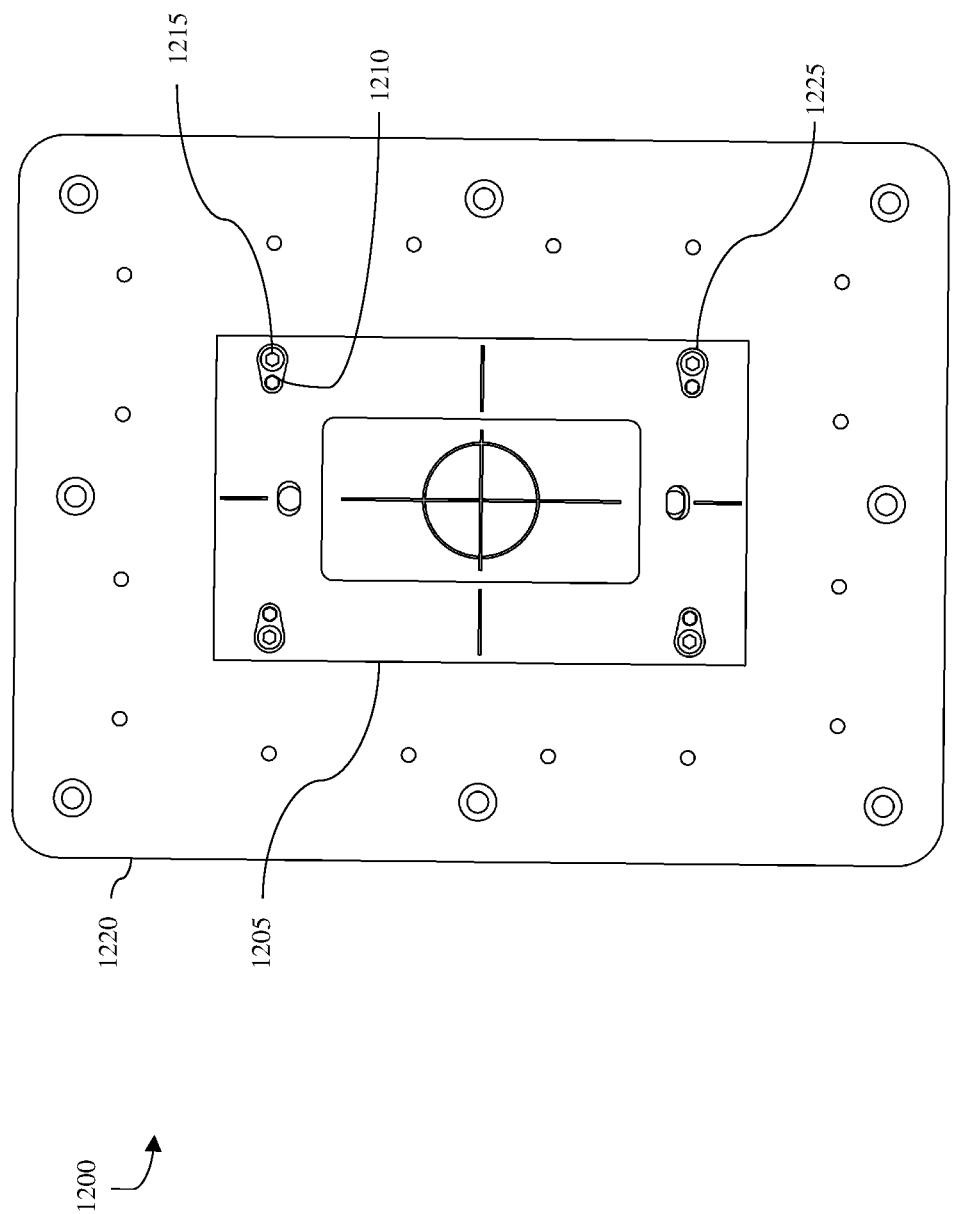
FIG. 12 is a front view of the system having the alignment cover, according to an example embodiment.

FIG. 12 illustrates a front view of the system 1200 including a protective plate 1205, a base plate 1220, a first threaded fastener 1210, a second threaded fastener 1215, and holes 1225 oriented so that the installer may access the first and second threaded fasteners. The holes are configured to be large enough such that the fasteners may be accessed and adjusted. The design of the protective plate supports the adjustability of the system by providing access to the first threaded fasteners and the second threaded fasteners such that the distance between the protective plate and the base plate, may be changed depending on the distance between the studs and the outermost surfaces of the wallboard.

Figure 13B:
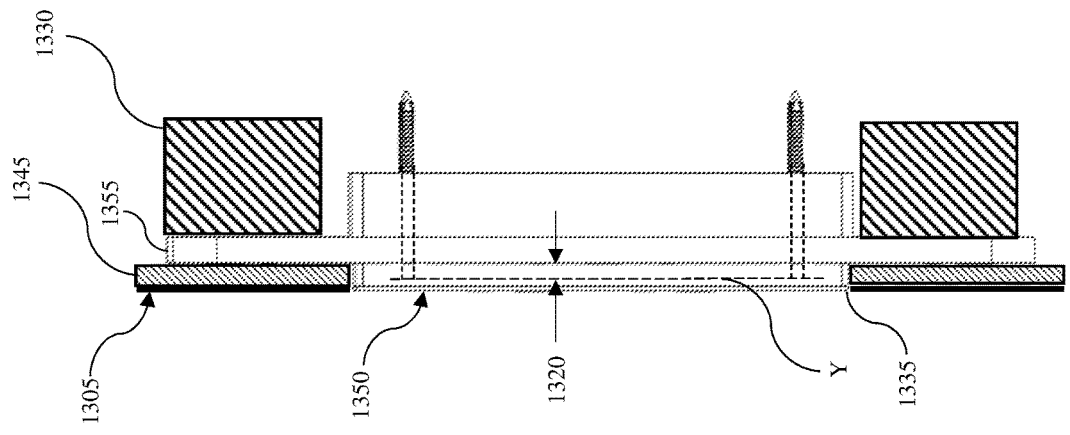
FIG. 13B is a cross-sectional view of the assembled system according to a second example embodiment.
Figure 13A:
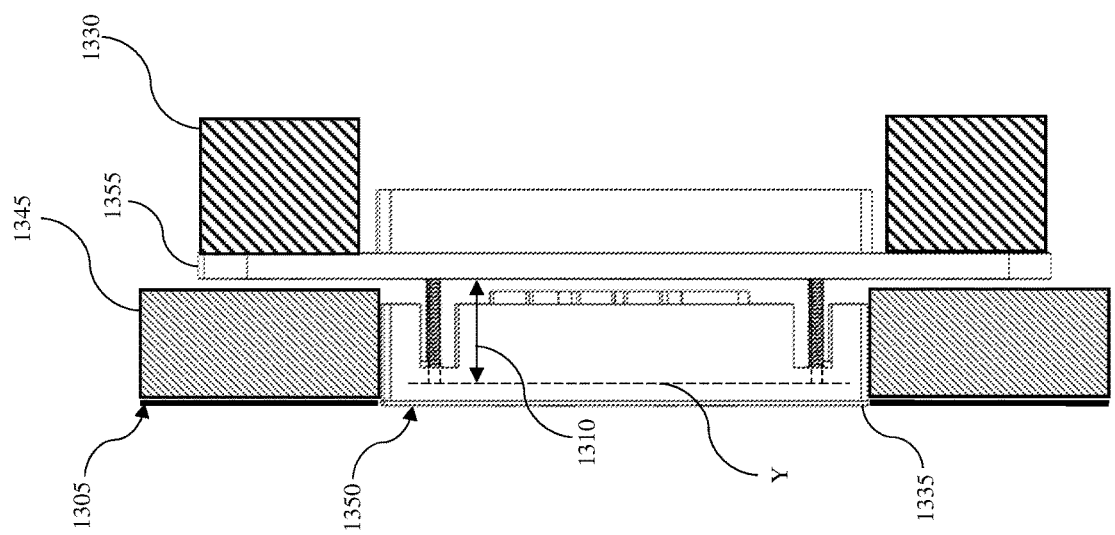
FIG. 13A is a cross-sectional view of the assembled system according to a first example embodiment.

FIG. 13A illustrates a cross sectional view of one embodiment of the system including a bracket 1330, a base plate 1355, an inner most surface of a mounting plate depicted by line Y, a wall structure 1345, an outward facing surface of the wallboard 1305, a cover plate 1335, a cover plate outward facing surface 1350, and a distance 1310, the distance 1310 being measured from the base plate to the inner most surface of the mounting plate.

FIG. 13B illustrates a cross sectional view of a second embodiment of the system including a bracket 1330, a base plate 1355, an inner most surface of a mounting plate depicted by line Y, a wall structure 1345, an outward facing surface of a wallboard 1305, a cover plate 1335, a cover plate outward facing surface 1350, and a distance 1320, the distance 1320 being measured from the base plate to the inner most surface of the mounting plate.

The cross-sectional views of FIGS. 13A and 13B show the adjustability of the mounting plate onto the base plate. The importance of the adjustability factor is relevant because all wall structures are not made the exact same, especially comparing a floor or ceiling to a drywall wall. The studs and brackets may vary in distance regarding how close of far they sit from the outermost surface of the wall, presenting a need for a system that can be adjusted easily to fit the present situation. FIG. 13A illustrates an embodiment where the studs of the wall structure are further away from the outward facing surface of the wallboard than in FIG. 13B. However, FIG. 13B illustrates a different embodiment where the studs of the wall structure are closer to the outward facing surface of the wallboard than FIG. 13A. This is an important feature the system presents. This adjustability factor allows the installer to achieve the distance necessary for the cover plate outward facing surface to sit flush with the outward facing surface of the wallboard.

Figure 14:
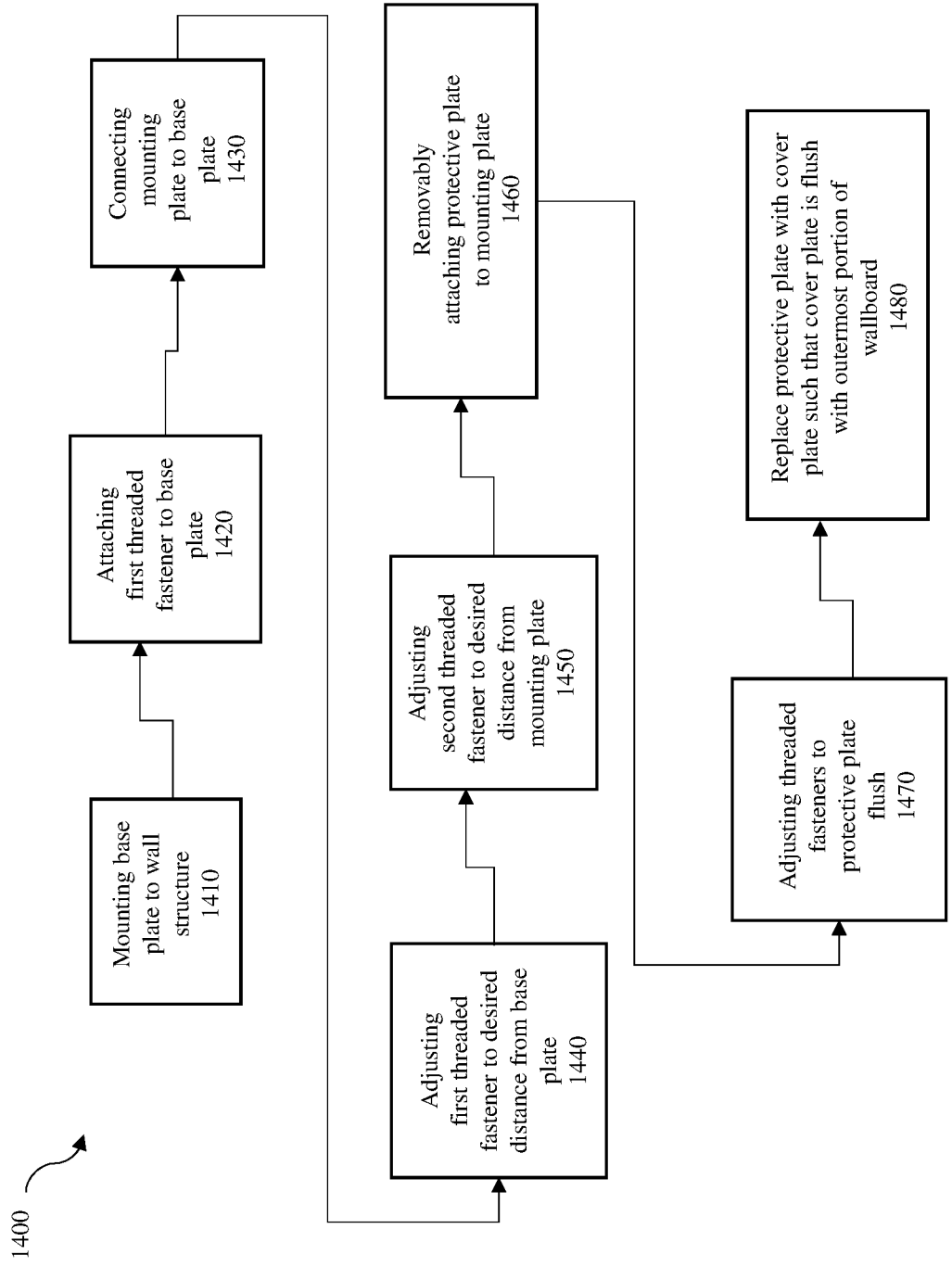
FIG. 14 is a method for adjustably mounting a component of an electrical assembly to a wall structure.

FIG. 14 illustrates a method 1400 for adjustably mounting a component of an electrical assembly to a wall structure. The method begins a user, or installer, which must set up the system within the wall structure. The installer first locates an electrical assembly component within a wall. In other embodiments, the component may be within a ceiling, floor, countertop, etc. Once located, the installer creates an opening in the wall so that the electrical assembly component is exposed such that the component is accessible for the installer. In step 1410, the installer mounts the base plate to at least one of the brackets and the stud of the wall structure, and a planar surface of the wall structure with adhesive. To mount the base plate, there must be at least one stud behind the wall structure, a planar surface of the wall structure, and the bracket available to secure the base plate to the studs. The installer locates the studs nearest to the component and secures the bracket to the studs by use of fasteners or adhesive. The installer may then secure the base plate to the bracket in a position allowing the electrical component to be centered inside the base plate main opening. The base plate may be secured through use of fasteners or adhesive. Now, the base plate is secured onto the bracket. The base plate main opening of the base plate is a space that accommodates the mounting plate.

Next, in step 1420, the installer attaches a first threaded fastener to the base plate, as shown in FIG. 7. The installer attaches the first threaded fastener to the base plate first fastener opening. If needed, the installer may choose the extent to which the first threaded fastener is fastened in the base plate first fastener opening such that a terminating end of the first fastener is a distance above the base plate. The terminating end of the first fastener stops the mounting plate from moving past the distance when the mounting plate is being attached. Ideally, the installer will use all four first fastener openings and four first threaded fasteners to ensure security. In step 1430, the installer connects the mounting plate to the base plate. In order to connect the two plates, the installer inserts a second threaded fastener into a second opening of the mounting plate. Then, the installer attaches the first portion of the second threaded fastener into the base plate second fastener opening, as shown in FIG. 7. The second threaded fastener will inhibit the mounting plate from moving away from the base plate while the first threaded fastener will inhibit the mounting plate from moving towards the base plate. Again, ideally, the installer will utilize every second fastener opening to ensure security. Now, the plates are securely connected. Next, the installer may attach the electrical component to the mounting plate. To do this, the installer inserts the electrical component fastener into the electrical component opening in the mounting plate.

Next, in step 1440, the installer adjusts the first threaded fastener so that the terminating end of the first threaded fastener is at a desired distance from the base plate. The desired distance is such that the cover in attachment with the mounting plate is substantially flush with an outermost surface of the wallboard. As depicted in FIG. 11A, the terminating end of the first threaded fastener acts as a stopping element that will butt against the mounting plate inside facing surface keeping the mounting plate from moving towards the base plate. The desired distance will allow the mounting plate to be positioned at a certain distance from the base plate such that the cover, when attached to the mounting plate, may be flush with the outermost surface of the wallboard. Then, in step 1450, the installer adjusts the second threaded fastener to the desired distance created by the first threaded fastener to secure the mounting plate to the desired distance. The terminating end of the second threaded fastener abuts an outward facing surface of the mounting plate and acts as a stopping element to stop the mounting plate from moving outward away from the base plate. The terminating end of the first threaded fastener abuts an inward facing surface of the mounting plate and stops the mounting plate from moving inward to the base plate. Because of the cancelling forces created by the terminating ends of the first threaded fastener and the second threaded fastener, the mounting plate is secured into the desired distance from the base plate. Then, the installer disposes the component of the electrical assembly within the mounting plate main opening. The mounting plate main opening and the base plate main opening are concentric.

Next, in step 1460, the installer attaches a protective plate, defining a pseudo cover, to the outermost surface of the mounting plate. The protective and mounting plates will attach magnetically. The protective plate has at least one hole providing access to at least one of the first threaded fastener and the second threaded fastener. The first threaded fasteners and second threaded fasteners are accessible through the holes in the protective plate. Then, in step 1470, the installer adjusts at least one of the first threaded fastener and second threaded fastener to the desired distance plate such that the protective plate is substantially flush with outermost surface of the wallboard. The protective plate acts as the cover plate to help the installer align the mounting plate to the desired distance that allows the cover plate outward facing surface to be flush with the wallboard. The installer is able to align the mounting plate so that that the protective plate and thus the cover plate will be substantially flush with each other because of the holes of the protective plate providing access to the fasteners and the protective plate's imitation of the cover plate. For example, if the installer includes another layer of paint while the protective plate is installed onto the mounting plate, then the installer can adjust the height of the outmost outward facing surface of the protective plate, ever so slightly, so that the outermost outward facing surface of the wallboard and the protective plate are substantially flush. Finally, in step 1480, the installer replaces the protective plate with the cover plate. The installer removes the protective plate and attaches cover plate to the component and the outward facing surface of the mounting plate. Both the cover plate and protective plate magnetically connect to the mounting plate and, therefore, may be detached and attached easily by perpendicular force. Following the steps of method 1400 should provide a seamless finish allowing the outermost surface of the system to be smooth.

The use of the devices, methods, and systems of the present invention also provides advantages in the electrical installation and wiring process over traditional systems. In a typical electrical installation and wall construction, the connector tabs of the various components (e.g., receptacles, Switches, etc.) are used to engage the wall board Surface.

Accordingly, the components cannot be attached to the electrical box until after the wall board is attached to the studs. However, since many building codes require an inspection of electrical installation work prior to closing up the walls with wallboard, a two-step installation and inspection process is typically required. Accordingly, an electrician typically attaches electrical boxes to the wall studs and runs wires into the electrical boxes. At this point, prior to connection of the electrical wires to the components and prior to attachment of the wall board to the studs, an inspector inspects the rough-in electrical work. If the electrical work passes the rough-in inspection, wall board is then attached to the studs. Now that the wallboard is attached, the component can be connected to the wires and attached to the electrical box. At this point, an inspector can perform a final inspection to ensure that the components have been properly installed. This standard process typically requires an electrician to work on the job site at least two separate times (rough-in installation and final installation) and requires at least two scheduled visits by an inspector (rough-in inspection and final inspection). This two-step process can cause significant delays and increased costs to the installation job and overall construction/remodel project.

In contrast, in the system of the present invention the connector tabs of the components, shown in FIG. 7, engage the base plate (as opposed to the wallboard) and the wallboard is applied over the base plate to engage the flange of the base plate. Accordingly, the component can be connected to the wires and connected to the base plate and electrical box. As such, an inspector is able to inspect the installation of the electrical box, wires, and component prior to installation of the wall board. In the present system, rough-in and final installation can be accomplished at the same time and the rough-in and final inspection can be performed at the same time. This greatly saves time and cost. Once installation and inspection are complete, the wall boards can be attached to the studs and the wall can be finished, as described above. As such, the inventive system offers significant advantages in installation and finishing look over traditional methods.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A system for adjustably mounting a component of an electrical assembly to a wall structure, wherein the wall structure comprises at least a wallboard, and wherein the system is configured so that an outward facing surface of the component may be adjustably positioned relative to the outward facing surface of the wallboard, the system comprising:
   a) at least one bracket disposed between adjacent studs of the wall structure;
   b) a base plate comprising (i) a base plate main opening, (ii) a base plate ring shaped mounting surface enclosing the base plate main opening and attaching to at least one of the at least of one bracket and a planar surface wall structure with adhesive, and (iii) at least one mounting feature protruding into base plate main opening, (iv) a first portion of a first threaded fastener movably attached to abase plate first fastener opening on at least one mounting feature, (v) a first portion of a second threaded fastener movably attached to a base plate second fastener opening on the least one mounting feature;
   c) a mounting plate comprising (i) a mounting plate main opening, (ii) a mounting plate ring shaped mounting surface enclosing the mounting plate main opening, (iii) a mounting plate first fastener opening disposed on the mounting plate ring shaped mounting surface, (iv) a mounting plate second fastener opening disposed on the mounting plate ring shaped mounting surface, and (v) at least one mounting plate magnet supported by the mounting plate; and,
   d) wherein in a fully assembled configuration (i) a second portion of the first threaded fastener engages an inward facing surface of the mounting plate ring shaped mounting surface and prevents the mounting plate from moving inward; and (ii) a second portion of the second threaded fastener engages an outward facing surface of the mounting plate ring shaped mounting surface and prevents the mounting plate from moving outward.

2. The system of claim 1, wherein the system further comprises: a cover plate comprising (i) a cover plate ring portion, (ii) a cover plate outward facing surface, (iii) at least one cover plate magnet supported by the cover plate ring portion, and (iv) wherein the at least one mounting plate magnet magnetically couples with the at least one cover plate magnet such that the cover plate outward facing surface is the outermost component of the system when in the fully assembled configuration.

3. The system of claim 2, wherein the cover plate defines at least one cover plate opening that provides functional access to the component of the electrical assembly.

4. The system of claim 1, wherein the cover plate comprises at least one slot disposed on the cover plate ring portion for receiving the least one cover plate magnet.

5. The system of claim 1, wherein the system further comprises:
   an electrical component fastener;
   at least one electrical component opening disposed inward from the mounting plate first fastener opening and second fastener; and,
   wherein electrical component fastener extends through the at least one electrical component opening attaching the mounting plate to the electrical component.

6. The system of claim 1, wherein the mounting plate comprises a flanged portion, wherein the flanged portion having a slot configured for receiving the least one mounting feature.

7. The system of claim 1, wherein the system comprises at least two brackets that are slidably engaged such that the brackets are slidably mounted with respect to each other to extend between the adjacent studs.

8. The system of claim 1, wherein the at least one bracket provides a rigid mounting surface.

9. The system of claim 1, wherein the electrical component is an electrical outlet.

10. The system of claim 1, wherein the base plate ring shaped mounting surface comprises at least a base plate fastener opening for receiving a mounting fastener to attach the base plate to the at least one bracket.

11. A system for adjustably mounting a component of an electrical assembly to a wall structure, wherein the wall structure comprises at least a wallboard, and wherein the system is configured so that an outward facing surface of the component may be adjustably positioned relative to the outward facing surface of the wallboard, comprising:

a) a base plate comprising (i) a base plate main opening, (ii) a base plate mounting surface enclosing the base plate main opening, (iv) a first stopping element in attached with base plate mounting surface, (v) a second stopping element in attached with base plate mounting surface;

b) a mounting plate comprising (i) a mounting plate main opening, (ii) a mounting plate mounting surface enclosing the mounting plate main opening, (iii) a mounting plate first stopping element opening disposed on the mounting plate mounting surface, (iv) a mounting plate second stopping element opening disposed on the mounting plate mounting surface; and, c) wherein in a fully assembled configuration and (i) a portion of the first stopping element engages an inward facing surface of the mounting plane mounting surface and prevents the mounting plate from moving inward and (i) a portion of the second stopping element engages an outward facing surface of the mounting plate mounting surface and prevents the mounting plate from moving outward.

12. The system of claim 11, wherein the system further comprises:
(i) at least one mounting plate magnet supported by the mounting plate; and,
(ii) a cover plate comprising
(a) a cover plate ring portion, (b) a cover plate outward facing surface, (c) at least one cover plate magnet supported by the cover plate ring portion, and (d) wherein the at least one mounting plate magnet magnetically couples with the at least one cover plate magnet such that the cover plate outward facing surface is the outermost component of the system when in the fully assembled configuration.

13. The system of claim 11, wherein the mounting plate second stopping element opening disposed on the mounting plate mounting surface comprises an opening diameter less than the diameter of the portion of the first stopping element.

14. The system of claim 11, wherein the system comprises at least two brackets that are slidably engaged such that the brackets are slidably mounted with respect to each other to extend between adjacent studs of the wall structure.

15. A method for adjustably mounting a component of an electrical assembly to a wall structure comprising:
mounting a base plate to at least one of (i) a bracket and (ii) a stud of the wall structure, and
(iii) a planar surface of the wall structure with adhesive, wherein the base plate comprises a base plate main opening to accommodate a mounting plate;
attaching a first threaded fastener to a base plate first fastener opening such that a terminating end of the first fastener is a distance above the base plate;
connecting the mounting plate to the base plate and insert a second fastener into a second opening of the mounting plate and attach the second threaded fastener to the base plate second fastener opening;
adjusting the first threaded fastener such that the terminating end of the first threaded fastener is a desired distance above the base plate; and
adjusting the second threaded fastener so that (i) the terminating end of the first threaded fastener abuts an inward facing surface of the mounting plate and stops the mounting plate from moving inward and (ii) the terminating end of the second threaded fastener abuts an outward facing surface of the mounting plate and stops the mounting plate from moving outward.

16. The method of claim 15 further comprising disposing the component of the electrical assembly within a mounting plate main opening, wherein the mounting plate main opening and the base plate main opening are concentric.

17. The method of claim 16 further comprising attaching a cover to the component and the outermost surface of the mounting plate.

18. The method of claim 17, wherein the desired distance is such that the cover in attachment with the mounting plate is substantially flush with an outermost surface of the wallboard.

19. The method of claim 15, wherein adjusting the first threaded fastener such that the terminating end of the first threaded fastener is a desired distance above the base plate comprises:
attaching a protective plate, defining a pseudo cover, to the mounting plate wherein the protective plate has a least one hole providing access to at least one of the first threaded fastener and the second threaded fastener;
adjusting the first threaded fastener to the desired distance above the base plate such that the protective plate is substantially flush with an outermost surface of the wallboard.

20. The method of claim 19, comprising:
removing the protective plate;
disposing the component of the electrical assembly within a mounting plate main opening, wherein the mounting plate main opening and the base plate main opening are concentric; and
attaching a cover to the component and the outward facing surface of the mounting plate.

\* \* \* \* \*